United States Patent
Dobbin et al.

(10) Patent No.: US 10,054,151 B2
(45) Date of Patent: Aug. 21, 2018

(54) INJECTABLE CAP

(71) Applicant: AIRBUS OPERATIONS LIMITED, Bristol (GB)

(72) Inventors: Richard Dobbin, Bristol (GB); David Liversage, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 392 days.

(21) Appl. No.: 14/785,252

(22) PCT Filed: Apr. 16, 2014

(86) PCT No.: PCT/GB2014/051194
§ 371 (c)(1),
(2) Date: Oct. 16, 2015

(87) PCT Pub. No.: WO2014/170674
PCT Pub. Date: Oct. 23, 2014

(65) Prior Publication Data
US 2016/0138641 A1    May 19, 2016

(30) Foreign Application Priority Data

Apr. 19, 2013 (GB) .................................. 1307134.5
Oct. 15, 2013 (GB) .................................. 1318256.3

(51) Int. Cl.
*F16B 37/14*    (2006.01)
*B64D 45/02*    (2006.01)
(Continued)

(52) U.S. Cl.
CPC .............. *F16B 37/14* (2013.01); *B29C 65/06* (2013.01); *B29C 65/08* (2013.01); *B29C 65/542* (2013.01);
(Continued)

(58) Field of Classification Search
CPC ......... B29C 65/06; F16B 37/04; F16B 11/006
(Continued)

(56) References Cited

U.S. PATENT DOCUMENTS 2,710,113 A    6/1955  Pritchard
4,659,273 A *  4/1987  Dudley ................. F16B 41/005
                                                411/373
(Continued)

FOREIGN PATENT DOCUMENTS

DE    102005030817 A1    1/2007
EP        0334011 A1     9/1989
(Continued)

OTHER PUBLICATIONS

International Search Report dated Aug. 28, 2013 in International Application No. PCT/GB2013/051274, filed May 17, 2013.
(Continued)

*Primary Examiner* — Gary W Estremsky
(74) *Attorney, Agent, or Firm* — Hauptman Ham, LLP

(57) ABSTRACT

The present invention proposes a cap for forming a sealed cavity around one end of a fastener to thereby contain out-gassing and sparking events in the event of a lightning strike to the fastener. The invention also proposes a joint comprising such a cap, and a kit of parts and method for installing such a cap. A cap according to the invention comprises: an inner cap member having an annular base terminating at an edge which surrounds an opening into an air cavity for enclosing the one end of a fastener; and an outer cap member having an annular skirt or flange which extends radially outwardly away from the annular base, the annular skirt or flange and annular base between them defining an annular sealing cavity. The cap also comprises a sealing material inlet comprising an opening in the outer cap member that is in fluid communication with the annular
(Continued)

sealing cavity, the opening being arranged to interconnect with a sealing material injection device to provide a flow of curable sealing material from the sealing material inlet into the annular sealing cavity. The inner cap member and outer cap member are welded together.

20 Claims, 17 Drawing Sheets

(51) Int. Cl.
*F16B 11/00* (2006.01)
*B29C 65/06* (2006.01)
*B29C 65/08* (2006.01)
*B29C 65/54* (2006.01)
*B29C 65/00* (2006.01)

(52) U.S. Cl.
CPC ............ *B29C 66/342* (2013.01); *B64D 45/02* (2013.01); *F16B 11/006* (2013.01)

(58) Field of Classification Search
USPC ........... 411/373, 372.5, 372.6, 377; 361/117, 361/218
See application file for complete search history.

(56) References Cited

U.S. PATENT DOCUMENTS

| | | | |
|---|---|---|---|
| 4,905,931 A | 3/1990 | Covey | |
| 4,971,745 A | 11/1990 | Ferenc et al. | |
| 5,364,213 A * | 11/1994 | Teramura | F16B 23/00 411/374 |
| 5,419,666 A | 5/1995 | Best | |
| 5,861,072 A * | 1/1999 | Medal | B29C 65/08 156/309.6 |
| 8,556,561 B2 * | 10/2013 | Norton | F01D 5/025 411/372.5 |
| 2012/0074257 A1 | 3/2012 | Bessho et al. | |
| 2012/0219380 A1 * | 8/2012 | Hutter, III | B64D 45/02 411/377 |
| 2013/0322982 A1 * | 12/2013 | Dobbin | B64D 45/02 411/82 |
| 2014/0161559 A1 * | 6/2014 | Kim | F16B 37/14 411/373 |
| 2015/0184688 A1 | 7/2015 | Dobbin et al. | |
| 2015/0367954 A1 * | 12/2015 | Rebbeck | B64D 37/32 361/218 |

FOREIGN PATENT DOCUMENTS

| | | |
|---|---|---|
| FR | 2626629 A1 | 8/1989 |
| WO | 2012107741 A1 | 8/2012 |
| WO | 2012118855 A2 | 9/2012 |
| WO | 2013178985 A1 | 12/2013 |

OTHER PUBLICATIONS

Written Opinion dated Aug. 28, 2013 in International Application No. PCT/GB2013/051274, filed May 17, 2013.
UKIPO Search Report dated Sep. 13, 2012 in GB Application No. 1209724.2.
UKIPO Search Report dated Sep. 24, 2013 in GB Application No. 1307134.5.
UKIPO Search Report dated Mar. 4, 2014 in GB Application No. 1316990.9.
International Search Report dated Aug. 1, 2014 in International Application No. PCT/GB2014/051194, filed Apr. 16, 2014.
Written Opinion dated Aug. 1, 2014 in International Application No. PCT/GB2014/051194, filed Apr. 16, 2014.
UKIPO Search Report dated Mar. 5, 2014 in GB Application No. 1318256.3.
Kenney, Warren E. "Joint Design a Critical Factor in Strong Bonds" original article published in Engineering Design, (1985). Copy obtained from http://www2.dupont.com/Plastics/en_US/assets/downloads/design/DCI285.
Chinese Office Action dated Mar. 20, 2017, CN Appln No. 201480021831.5.

* cited by examiner

INJECTABLE CAP

RELATED APPLICATIONS

The present application is a National Phase of International Application Number PCT/GB2014/051194, filed Apr. 16, 2014, and claims priority from Great Britain Application Number 1307134.5, filed Apr. 19, 2013 and Great Britain Application Number 1318256.3, filed Oct. 15, 2013.

FIELD OF THE INVENTION

The present invention relates to a cap for forming a sealed cavity around one end of a fastener, a joint comprising such a cap, and a kit of parts and method for installing such a cap.

BACKGROUND OF THE INVENTION

A known method of providing spark suppression is described in EP-A-0334011. A volume of gas is enclosed by a cap around the fastener. The gas provides spark suppression for arcing that may occur between the composite structure and the metal fastener during any lightning strike.

SUMMARY OF THE INVENTION

A first aspect of the invention provides a cap for forming a sealed cavity around one end of a fastener, the cap comprising: an inner cap member having an annular base terminating at an edge which surrounds an opening into an air cavity for enclosing the one end of a fastener; an outer cap member having an annular skirt or flange which optionally extends radially outwardly away from the annular base, the annular skirt or flange and annular base between them defining an annular sealing cavity; and a sealing material inlet comprising an opening in the outer cap member that is in fluid communication with the annular sealing cavity, the opening being arranged to interconnect with a sealing material injection device to provide a flow of curable sealing material from the sealing material inlet into the annular sealing cavity. The inner cap member and outer cap member are welded together by one or more welds. Welding the cap members together prevents the outer cap member from becoming dislodged by the pressure of the sealing material.

The inner cap member and outer cap member may welded together by only a single weld, but more typically they are welded together by three or more welds with passages between the welds to enable the curable sealing material to flow between the welds and into the annular sealing cavity.

Since the sealing material can be injected after positioning of the cap onto an end of a fastener it is possible to use sealing materials with short handling and curing times. The sealing material can be mixed in the sealing material injection device on application, thus ensuring that the material is applied during its working life and before it has started to cure. Quick cure sealing materials have the advantage of providing a stable bond very quickly. That is, the installed cap will be able to withstand accidental knocks or similar from assembly workers within a short timeframe.

The annular sealing cavity provides a large contact area for the seal which in turn provides a strong, reliable bond between the cap and structure in a relatively small footprint area. A good seal between the cap and structure is essential, both to maintain a sealed volume of air within the air cavity so that the air cavity can safely contain out-gassing and sparking caused during a lightning strike, and to prevent leakage of fuel into the air cavity.

The cap of the present invention also prevents air gaps within the cured seal, and provides for a clean and consistent application process. It is particularly important to prevent air gaps in the sealing material since such air gaps compromise the seal (bond line) and thereby permit fuel leakage into the air cavity.

Sealing material within the annular sealing cavity has a primary function of sealing the air cavity when the nut cap is installed over a fastener passing through a structure, but may also have a function of bonding the cap to the structure. Thus, the sealing material may comprise a sealing and bonding material. Similarly, the annular sealing cavity may comprise an annular sealing and bonding cavity.

The opening of the sealing material inlet is preferably centred on a central axis of the outer cap member. Such a central position ensures an even flow to the whole circumference of the annular sealing cavity. Alternatively, the opening may be offset from the central axis in some embodiments in order to enable installation of the cap in confined spaces. It may be necessary in such cases to incorporate additional restriction features or other features into the cap to ensure that the flow of sealant material is able to provide an even seal (bond line).

The cap may further comprise a reservoir arranged to receive curable sealing material from the opening and distribute it to the annular sealing cavity. The reservoir may comprise an open-topped chamber axially aligned with (i.e. positioned directly beneath) the opening.

The inner cap member preferably comprises a substantially dome-shaped portion extending from the annular base, and the outer cap member preferably comprises a corresponding substantially dome-shaped portion extending from the annular skirt or flange. The dome shape of the outer cap member reduces the likelihood of damage to the cap e.g. by accidental knocking by an assembly worker, and minimises stress concentrations. The dome shape of the inner cap member enables the volume of the air cavity to be minimised, and therefore minimises the overall size and mass of the cap. The dome shape thus maximises the air cavity volume for a given weight and space envelope.

The cap may comprise a plurality of channels formed in either an outer surface of the inner cap member or an inner surface of the outer cap member, each channel being in fluid communication with the opening of the sealing material inlet and the annular sealing cavity. The inner cap member and outer cap member may be welded together between these channels.

The channels may be shallow channels which extend over only part of the gap between the inner and outer cap members—the rest of the gap providing a continuous interfay region. More preferably either: the channels are formed in the outer surface of the inner cap member and separated by ridges which abut the inner surface of the outer cap member; or the channels are formed in the inner surface of the outer cap member and separated by ridges which abut the outer surface of the outer cap member. Thus in this case the ridges divide the gap between the inner and outer cap members into a plurality of channels and do not permit the sealing material to flow between the channels. The ridges may be welded to the other cap member where they abut that other cap member.

Typically each channel has a channel inlet arranged to receive the flow of curable sealing material from the sealing material inlet and an outlet arranged to feed the flow of curable sealing material into the annular sealing cavity. The channels may run all the way to the edge of the annular base of the inner cap member, but more preferably the outlets of the channels are set back in an axial direction from the edge of the annular base of the inner cap member.

The inner or outer cap member may be formed with channels on one side only, but more preferably the inner or outer cap member has a corrugated shape. That is, either: the channels are formed in an outer surface of the inner cap member and a plurality of corresponding channels are formed in an inner surface of the inner cap member; or the channels are formed in an inner surface of the outer cap member and a corresponding plurality of channels are formed in an outer surface of the outer cap member. Forming the inner or outer cap member with such a corrugated shape enables relatively narrow channels to be formed without resulting in a large amount of extra weight.

The inner or outer cap member typically has side walls forming the channels with a substantially uniform wall thickness. This minimises the weight of the cap.

Each channel may have a width which increases as it extends towards the annular sealing cavity. This encourages the separate streams of sealing material from the different channels to merge as they exit the channels.

Each channel may have a depth which decreases as it extends towards the annular sealing cavity.

Preferably, the annular skirt or flange of the outer cap member terminates at an edge, the edge of the annular skirt or flange being offset in an axial direction from the edge of the annular base of the inner cap member. That is, when the cap is in place with the end of the fastener enclosed within the air cavity and the edge of the inner cap member abutting the structure through which the fastener passes, there will usually be a gap between the edge of the annular skirt or flange and the structure. This gap enables sealing material to flow out from the annular sealing cavity so that it forms a visible ring around the cap, thus providing a visual indication of a complete and uniform seal. The offset edge also enables the cap to be fitted to structures which have a raised region such as a fillet radius or step close to the edge of the inner cap member.

The inner cap member and outer cap member are preferably formed as separate parts before they are assembled and welded together. By forming the two members as separate parts the manufacturing process is considerably simplified. The inner and outer cap members may be formed by injection moulding, preferably from a thermoplastic material such as a glass-filled polyetherimide (PEI).

Optionally the outer cap member is transparent in order to observe the sealing material as it is injected.

The annular sealing cavity may have a generally flared shape such that its cross-sectional area decreases with distance from the edge of the annular base. Thus, the area of sealing material in contact with the structure to which the cap is to be bonded can be maximised without increasing the overall diameter of the cap. The annular skirt or flange thus preferably extends radially outwardly from the annular base at an acute angle to the annular base. Alternatively the annular skirt or flange may extend radially outwardly from the annular base at a right angle to the annular base.

The annular skirt or flange may extend radially outwardly from the annular base along its full length. Alternatively the annular skirt or flange may comprise a cylindrical portion which extends parallel with the annular base, and a shoulder which extends radially outwardly from the annular base and joins the cylindrical portion to an outboard portion of the outer cap member (which may be domed). The shoulder may extend radially outwardly from the annular base at an acute angle to the annular base, or at a right angle to the annular base.

The sealing material inlet may comprise a projection (such as a boss) in the outer cap member, the projection containing the opening and being arranged to interconnect with the sealing material injection device.

The annular parts of the cap (that is, the annular base, the annular skirt or flange, and the annular sealing cavity) may have a generally circular shape in cross-section, or they may be any other closed shape in cross-section such as hexagonal or square (for instance to enclose a fastener with a hexagonal or square shape).

A second aspect of the present invention provides a joint comprising: a structure; a fastener passing through the structure; a cap according to the first aspect, wherein the air cavity of the inner cap member encloses an end of the fastener and the edge of the inner cap member abuts the structure; and sealing material filling the annular sealing cavity of the cap and contacting the structure to seal the air cavity.

The sealing material within the annular sealing cavity thus serves to maximise the seal (bond) thickness and the leak path length between the outside of the seal (bond) and the air cavity (inner cavity).

In preferred embodiments the sealing material (or sealing and bonding material) fills the annular sealing cavity to also bond the cap to the structure. The bond between the cap and the structure is thus formed by the cap-sealant material bond and the sealant material-structure bond.

A cap according to the first aspect may enclose each end of the fastener, so that the joint is sealed from both sides of the structure.

The structure is preferably a structural component of an aircraft, more preferably a structural component of an aircraft wing, and most preferably a structural component of an aircraft wing which forms a boundary wall of a fuel tank. The structure preferably comprises a composite structural component, and the fastener may be a metal fastener. In such cases a lightning strike may be particularly likely to occur at the fastener. The structure typically comprises a pair of structural parts which are joined together by the fastener. In such aircraft applications the air cavity of the cap provides an air pocket within which controlled out-gassing or sparking events can safely occur in the event of a lightning strike. The sealing material also provides a fluid tight seal around the end of the fastener, thus preventing fuel leakage through the hole in the structure through which the fastener passes.

The inner cap member may or may not abut the fastener. If it abuts the fastener then it may abut the fastener via a plurality of ribs projecting from an inner surface of the inner cap member.

The fastener may project from the structure or it may be countersunk within the structure.

A third aspect of the invention provides a kit of parts which can be assembled to provide a cap according to the first aspect of the invention. The kit of parts comprises an inner cap member having an annular base terminating at an edge which surrounds an opening into an air cavity for enclosing the end of a fastener; and an outer cap member having an annular skirt or flange. The cap members are shaped so that when assembled with the inner cap member fitted inside the outer cap member, the annular skirt or flange and annular base between them define an annular sealing cavity. The inner or outer cap member comprises a wall which is formed with a weld feature which protrudes from the wall so that it comes into contact with the other cap member when the inner and outer cap members are being assembled.

There may be only a single weld feature, but more typically the inner or outer cap member comprises a wall which is formed with three or more weld features which protrude from the wall so that they come into contact with the other cap member when the inner and outer cap members are being assembled, with passages between the welds to enable the curable sealing material to flow between the welds and into the annular sealing cavity.

The weld feature typically protrudes from the wall, and the wall has a wall thickness which increases at the weld feature. This increased wall thickness provides material which can coalesce to form a weld.

The weld feature and the other cap member may have substantially parallel opposing surfaces which are arranged to form a shear weld.

The weld feature may be formed between a pair of the channels in the inner or outer cap member.

Optionally the kit further comprises a sealing material injection device having a nozzle arranged to interconnect with the sealing material inlet of the cap to direct a flow of curable sealing material into the annular sealing cavity.

By providing the cap separately from the curable sealing material, the sealing material can be a quick cure sealing material of the type which has a short working life, since it is applied directly to the assembled cap, optionally via a static mixing nozzle. The kit of parts can be used to form the joint of the second aspect, and thereby achieve the associated benefits. The cap may comprise a cap according to the first aspect.

The injection device may be powered manually, electrically, or by compressed air. The injection device may be arranged to deliver a fixed volume of sealing material to thereby ensure a controlled and consistent application process.

A fourth aspect of the invention provides a method of installing a cap according to the first aspect of the invention to form a sealed cavity around one end of a fastener passing through a structure. The method includes: installing the cap over the one end of the fastener so that it is enclosed within the air cavity of the inner cap member and the edge of the annular base abuts the structure; injecting curable sealing material into the annular sealing cavity via the sealing material inlet so that the curable sealing material contacts the structure; and curing the curable sealing material to seal the air cavity.

The cured sealing material may thus form a continuous void-free seal (bond) around the air cavity.

The step of curing the curable sealing material may also include adhering the cap to the structure.

The method may result in a joint according to the second aspect and may use a kit of parts according to the third aspect.

The structure preferably comprises a structural component of an aircraft, more preferably a structural component of an aircraft wing, and most preferably a structural component of an aircraft wing which forms a boundary wall of a fuel tank. The structure preferably comprises a composite structural component or a hybrid assembly of composite and metallic structural components, and the fastener comprises a metal fastener. In such cases a lightning strike may be particularly likely to occur at the fastener or in an area immediately surrounding the fastener. The structure typically comprises a pair of structural parts which are joined together by the fastener. In such aircraft applications the air cavity of the cap provides an air pocket which will safely contain out-gassing or sparking events that occur in the event of a lightning strike. The sealing material also provides a fluid tight seal around the end of the fastener, thus preventing fuel leakage into the inner air cavity.

A further aspect of the invention provides a method of manufacturing a cap according to the first aspect. The method comprises assembling the inner cap member inside the outer cap member, and joining the inner cap member and outer cap member together by welding. The cap members may be joined together by any welding method which causes coalescence between the cap members—including for example electrode spot welding or ultrasonic welding. In the case of ultrasonic welding the inner and outer cap members may be contacted by respective ultrasonic tools, and welded together with ultrasonic energy from one or both of the ultrasonic tools.

The cap members may be welded together after assembly, but more preferably a relative movement is generated between the inner and outer cap members during assembly and the cap members are welded together during this relative movement. Typically the cap members are brought together in a first assembly phase to a partially assembled position where weld regions of the cap members come into contact with each other; then the cap members are moved beyond the partially assembled position to a fully assembled position in a second assembly phase, the weld regions coalescing during the second assembly phase.

The inner and outer cap members may have substantially parallel telescoping surfaces which coalesce in shear to weld the inner and outer cap members together.

Typically the inner cap member comprises a shoulder joining the annular base to an outboard portion (which may be domed) with a smaller outer diameter than the annular base, the shoulder meeting the annular base at a convex corner and meeting the outboard portion at a concave corner; and the outer cap member comprises a corresponding shoulder joining the annular skirt or flange to a corresponding outboard portion (which may be domed) with a smaller inner diameter than the annular skirt or flange, the corresponding shoulder meeting the annular skirt or flange at a convex corner and meeting the corresponding outboard portion at a concave corner.

In some embodiments the shoulder of the inner cap member is welded to the corresponding shoulder of the outer cap member, optionally via a weld feature in the inner or outer cap member. In other embodiments the outboard portion of the inner cap member is welded to the outboard portion of the outer cap member, optionally via a weld feature in the inner or outer cap member.

Any of the optional, or desirable, features discussed above or below in relation to any of the aspects of the invention may be applied to any other aspect, either individually or in any combination.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
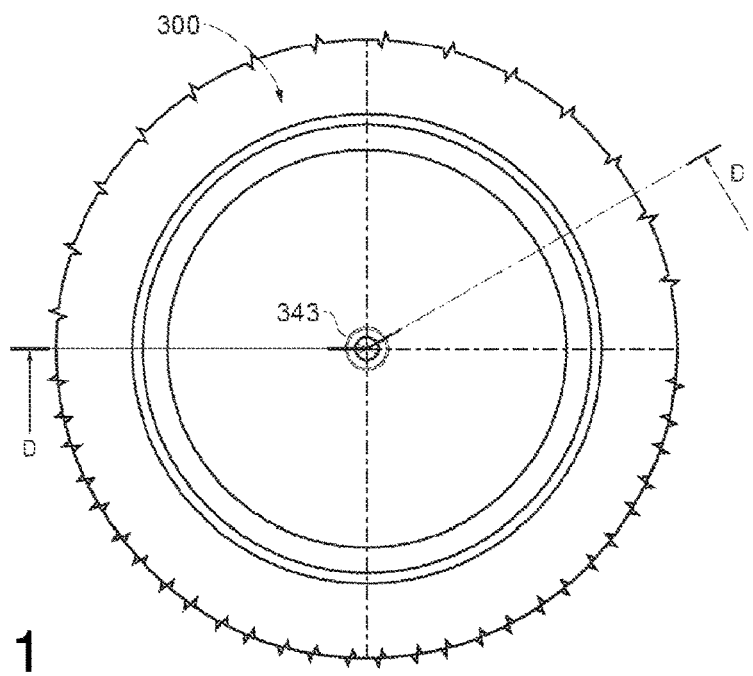
FIG. 1 is a plan view of a nut cap according to a first embodiment of the invention in an installed state.

FIGS. 1 and 2 show an injectable nut cap 300 according to a first embodiment of the present invention.

The nut cap includes an inner cap member 310 and an outer cap member 320 shown in FIGS. 3-12. The inner and outer cap members 10, 20 are injection moulded from a thermoplastic material such as glass-filled polyetherimide (PEI). A suitable glass-filled PEI is Ultem™ 2400, which includes 40% glass fibres by volume; or Ultem™ 2310, which includes 30% glass fibres by volume. The inner and outer cap members may alternatively be made by moulding, by an additive manufacturing process, or by any other suitable process.

Figure 2A:
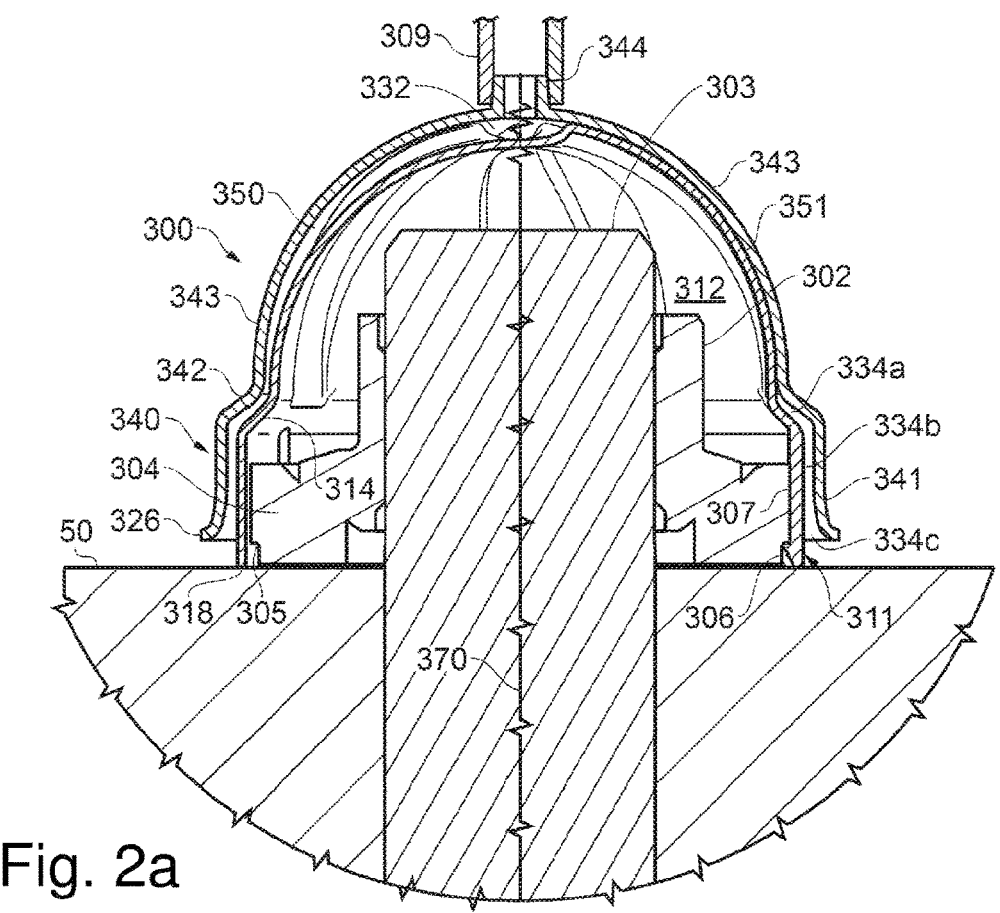
FIG. 2a is a section view taken along a line D-D in FIG. 1 before injection of sealing material.
Figure 2B:
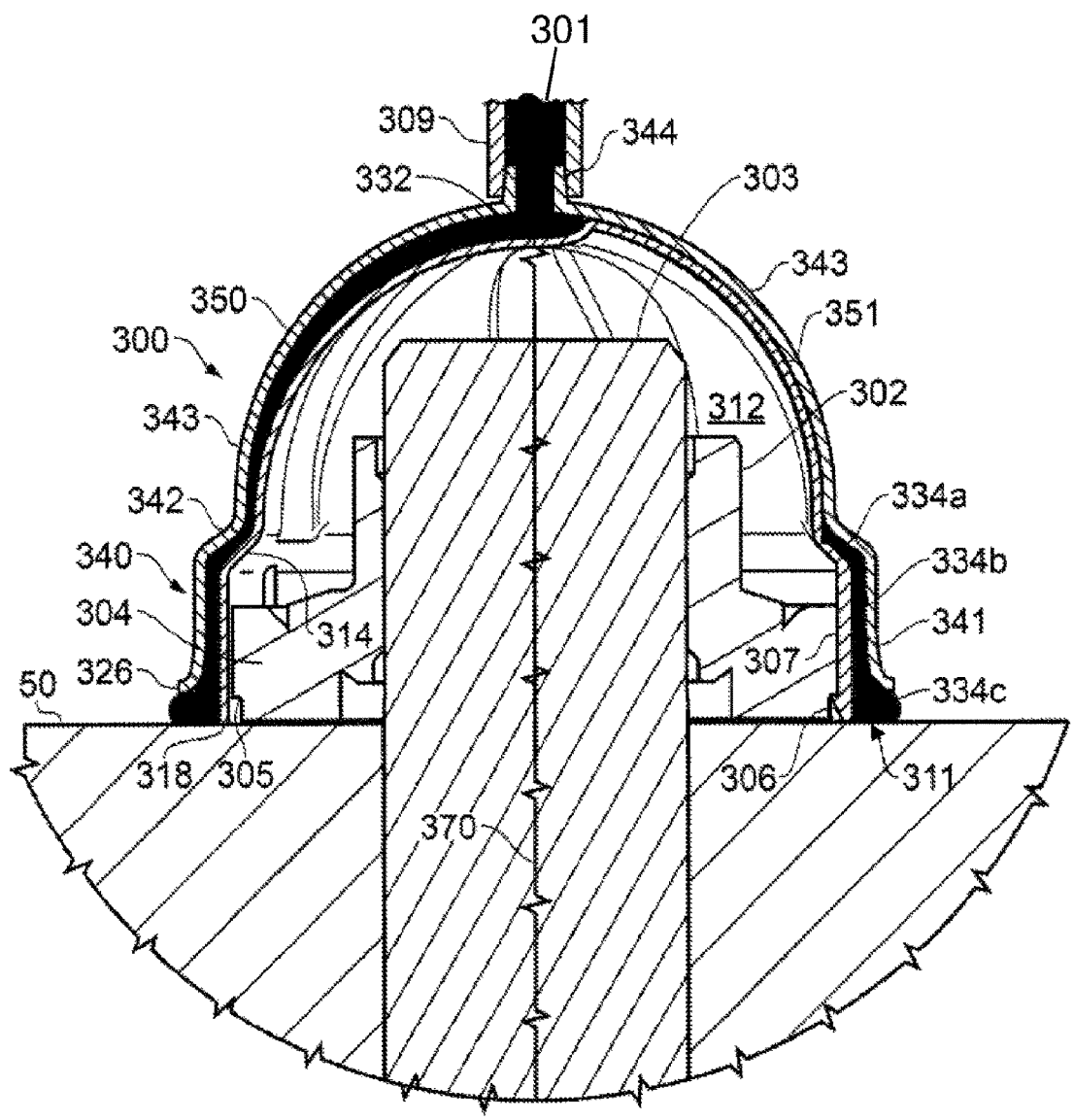
FIG. 2b is a section view taken along a line D-D in FIG. 1 after injection of sealing material.

The inner cap member 310 is a generally thin-walled dome-shaped member, with a correspondingly dome-shaped inner air cavity 312 which encloses the tail end of a fastener as shown in FIGS. 2a and 2b.

Figure 3:
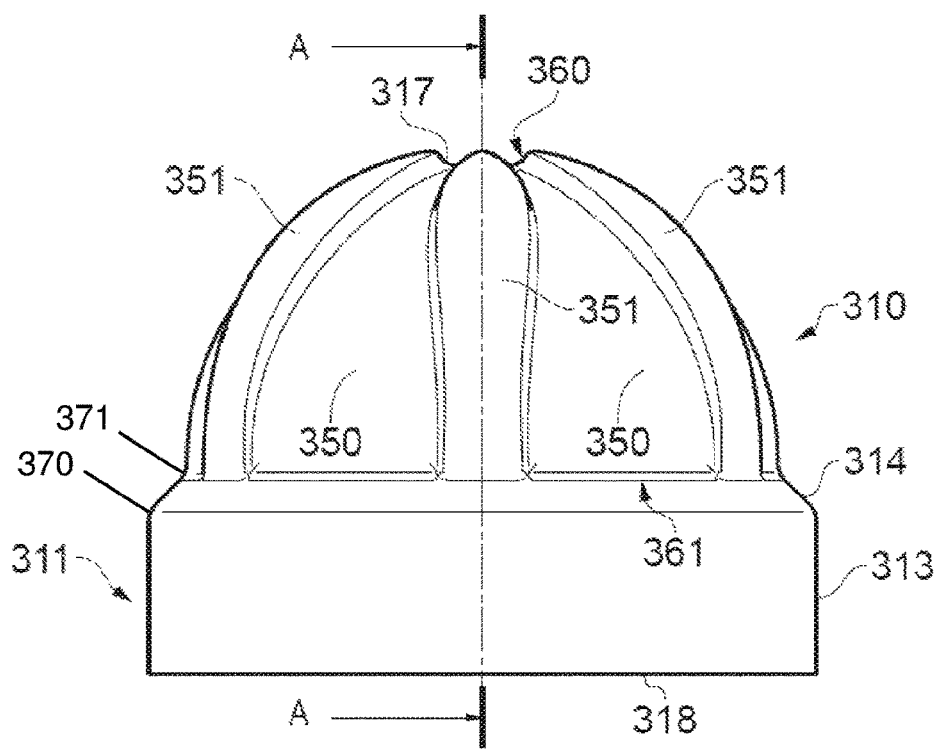
FIG. 3 is a side view of an inner cap member of the nut cap of FIG. 1.
Figure 4:
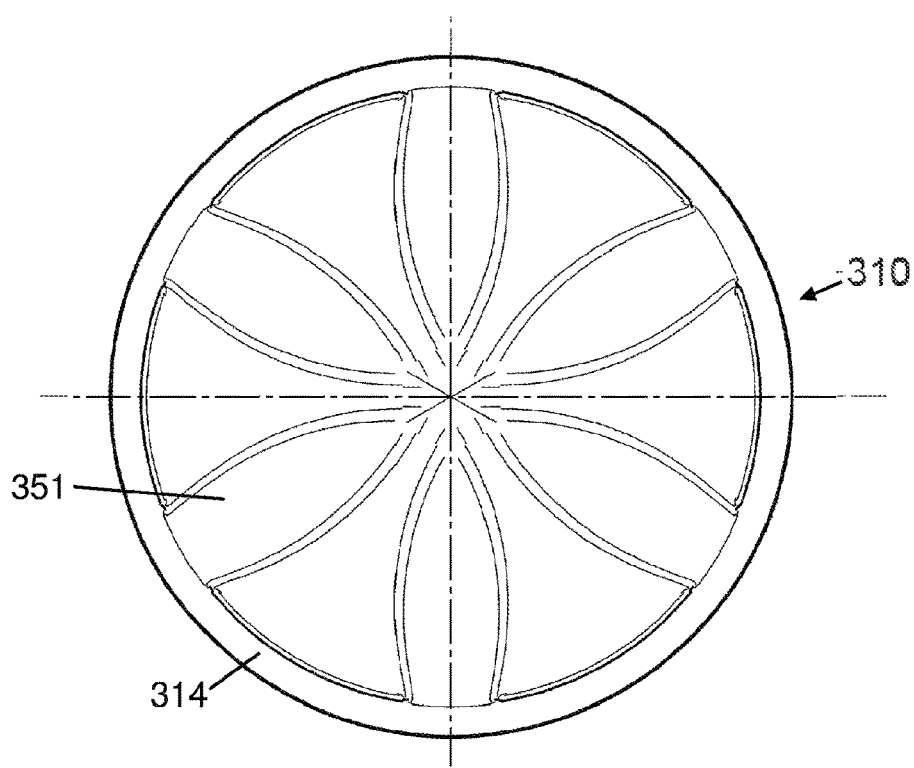
FIG. 4 is a plan view of the inner cap member of FIG. 3.
Figure 5:
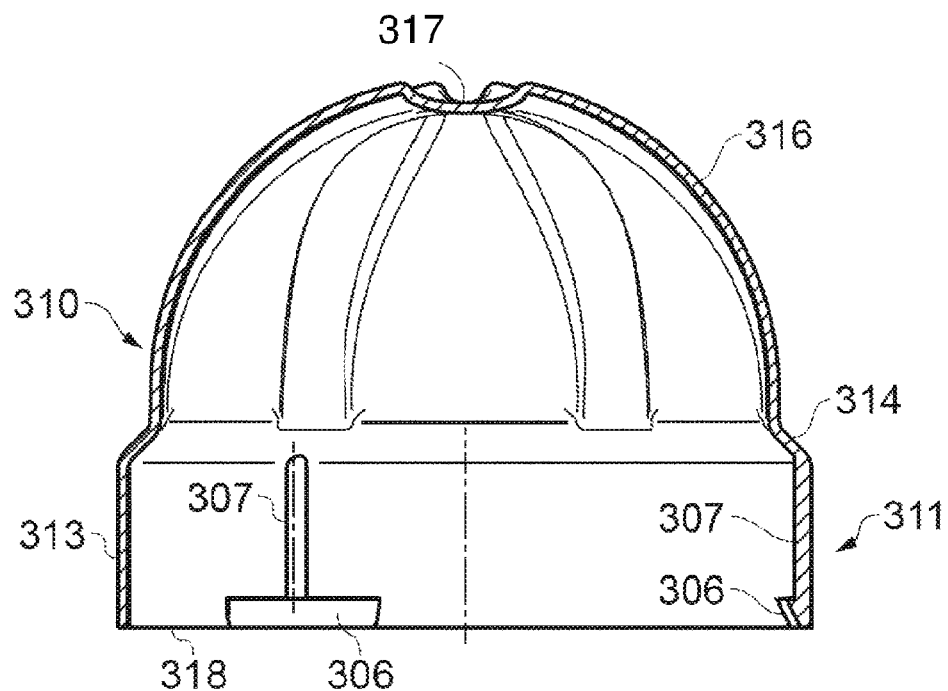
FIG. 5 is a section view taken along a line A-A in FIG. 3.
Figure 6:
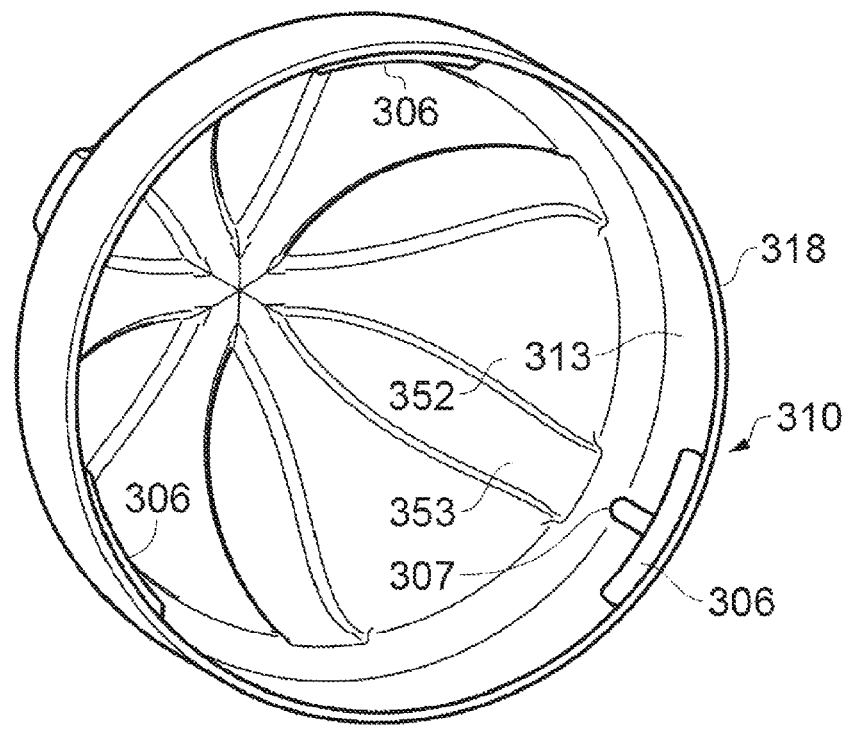
FIG. 6 is an isometric view of the inner cap member of FIG. 5, viewed from below and one side.

Referring to FIG. 3, the inner cap member 310 is generally made up of a base 311 and a domed portion 310. The base 311 has a cylindrical portion 313 and a shoulder 314. The shoulder 314 joins the cylindrical portion 313 to the smaller diameter domed portion 310 which extends from the base 311 to an apex 317. The shoulder 314 meets the cylindrical portion at a convex corner 370 and meets the domed portion 310 at a concave corner 371. In the installed state of FIG. 2, the exposed inboard edge 318 of the cylindrical portion 313 abuts the structural element 50 to fully encapsulate the tail end of the fastener within the air cavity 312. The fastener comprises a nut 302 screwed onto a bolt 304, and a washer 304. The cylindrical portion 313 of the base 311 has mechanical locking features for providing a mechanical connection between the inner cap member 310 and the fastener. In this example, the washer 304 incorporates an overhang portion 305 which interconnects with three snap-fit projections 306 protruding from the inner surface of the cylindrical portion 313. These projections 306 prevent the cap from being forced away from the structure 50 by the pressure of the sealant material as it is injected. The inner cap member also has three axially extending ribs 307 which grip the sides of the washer 304 as shown in FIGS. 2a and 2b.

Figure 7:
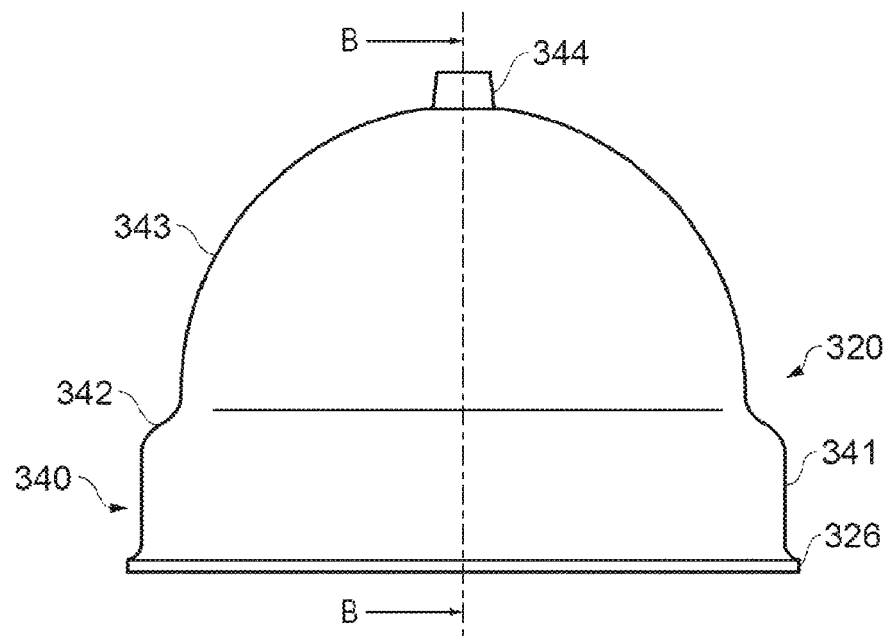
FIG. 7 is a side view of an outer cap member of the nut cap of FIG. 1.
Figure 8:
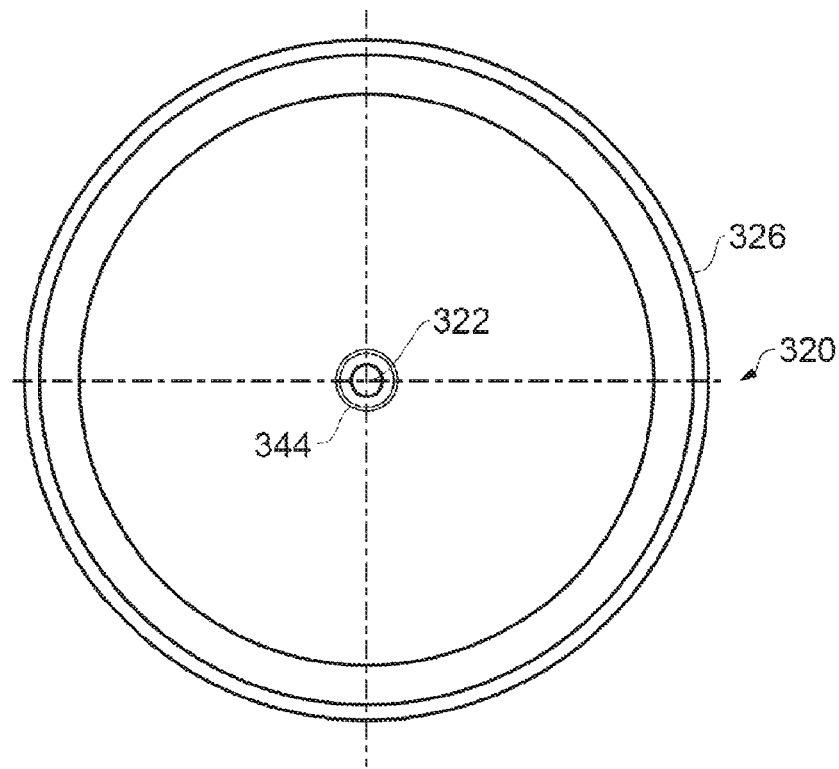
FIG. 8 is a plan view of the outer cap member of FIG. 7.
Figure 9:
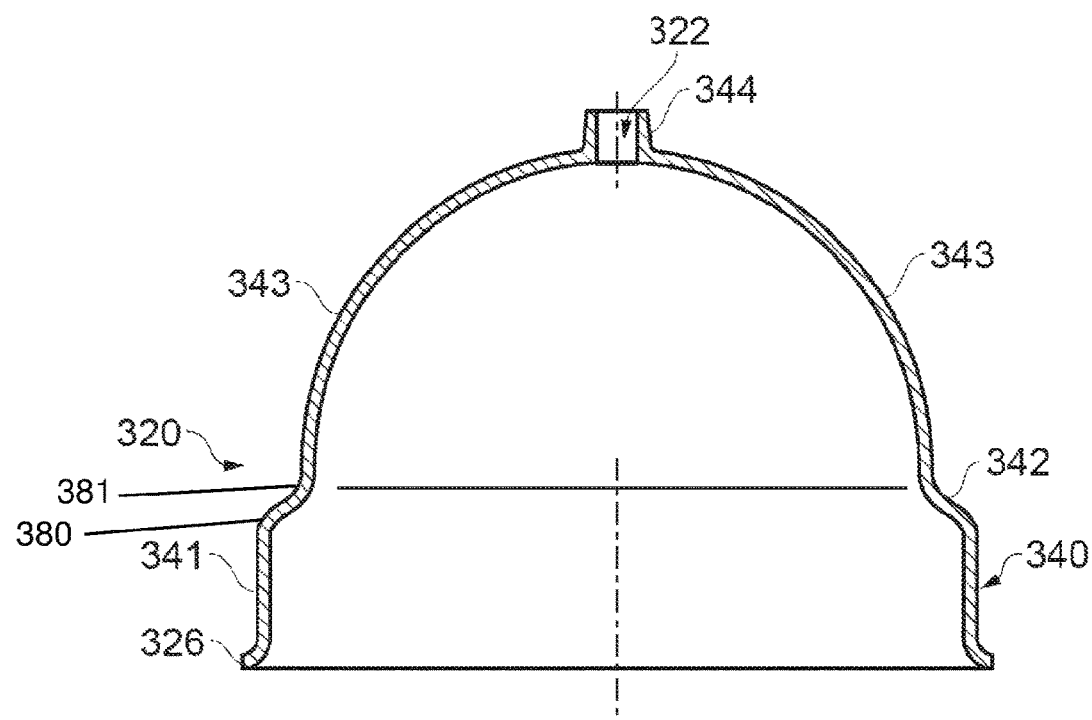
FIG. 9 is a section view taken along a line B-B in FIG. 7.
Figure 10:
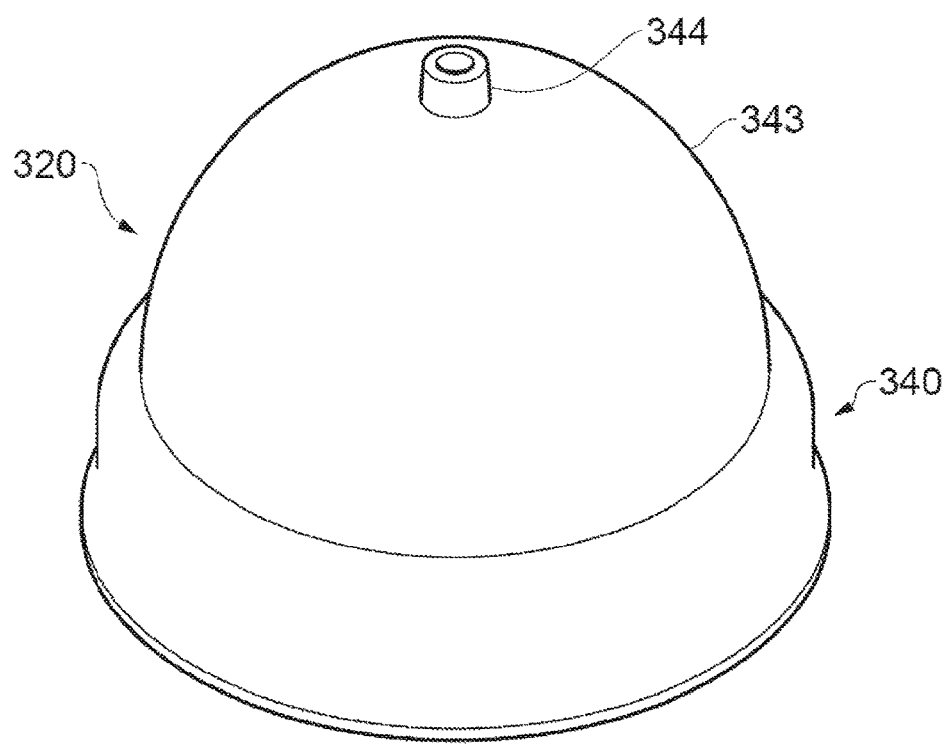
FIG. 10 is an isometric view of the outer cap member of FIG. 7, viewed from above and one side.

Referring to FIG. 7, the outer cap member 320 is also a generally thin-walled dome shaped member, and is shaped to fit over the inner cap member 310. The outer cap member 320 is generally made up of an annular skirt 340 and a smaller diameter domed outboard portion 343. The annular skirt 340 has a cylindrical portion 341, a shoulder 342 joining the cylindrical portion 341 to the domed outboard portion 343, and a flared lip 326 at its free edge. The shoulder 342 meets the cylindrical portion 341 at a convex corner 380 and meets the domed portion 343 at a concave corner 381. A tapered boss 344 at the apex of the domed outboard portion 343 contains an opening 322. The outer diameter of the boss 344 is sized to be received within the nozzle of a sealing material injector gun 309 as shown in FIG. 2b. Fitting the nozzle over the boss 344 is preferred (rather than vice versa) since it does not restrict the flow of sealant material and results in a less directional flow of sealant into the cap. Optionally the nozzle may interconnect with the boss via a bayonet fitting or similar.

The inner cap member has side walls with a substantially uniform wall thickness. The side walls are corrugated to form six outward-facing ridges 351 and channels 350 in an outer surface of the inner cap member and the same number of corresponding inward-facing ridges 352 and channels 353 in an inner surface of the inner cap member. The ridges 351 abut the inner surface of the domed portion 343 of the outer cap member as shown in FIG. 2a so that the sealing material cannot flow between the channels 350. The ridges 351 are attached to the inner surface of the outer cap member 320 by ultrasonic welding.

The nozzle 309 delivers a continuous flow of sealing material 301 into a sealing volume between the cap members via the opening 322. A two-part epoxy based structural adhesive such as Scotch-Weld™ 7256 B/A, produced by 3M™ may be used. This adhesive is supplied in cartridge form (50 ml cartridges being preferred) and mixed within the nozzle 309 on application by the injector gun. Such epoxy based adhesives are free-flowing, have a low viscosity, and exhibit rapid cure at room temperature. A suitable alternative material is a two-part polysulphide based sealant such as Naftoseal™ MC-238 Class A/B, produced by Chemetall. MC238A-2 is particularly preferred, having a two hour working life and low viscosity.

The sealing volume between the inner and outer cap members 310, 320 has three key regions: a reservoir 332; an annular sealing volume (or pocket) 334a-c between the skirt 340 and the base 311; and the channels 350 which interconnect the reservoir 332 and the annular sealing volume 334a-c.

The reservoir 332 is directly below the opening 322 so that it receives sealing material 301 directly therefrom. The reservoir 332 serves to improve the flow of sealing material into the sealing volume 334a-c by providing a relatively low flow resistance, and also serves to provide an even, uniform flow into the channels 350. Once cured, the sealing material within the channels 350 serves to bond the inner cap member 310 and outer cap member 320 together, and adds structural rigidity to the cap 300.

The annular sealing volume has three parts shown in FIG. 2a: an upper part 334a between the shoulders 314, 342; a cylindrical part 334b between the cylindrical portions 341, 313; and a lower part 334c between the base 311 and the lip 326.

The shoulder 342 extends radially outwardly away from a central axis 370 of the cap at a large acute angle, which is larger than the acute angle of the shoulder 314. Therefore the inner surface of the shoulder 342 extends radially away from the outer surface of the shoulder 314 at a small acute angle so that the upper part 334a of the annular sealing volume 334 has a flared shape with a cross-sectional area which increases with distance from the opening 322. The lower part 334c of the annular sealing volume also has a flared shape due to the flared lip 326 such that its cross-sectional area increases with distance from the opening 322. The annular sealing volume 334a-c is open at its lower face such that the sealing material can flow outwardly from the annular sealing volume and into contact with the structural element 50.

The lip 326 is axially offset from the base edge 318 of the inner cap member 310. This arrangement ensures that the outer cap member 320 does not clash with features of the structural element, such as ramps or radii (fillets), in the event that the fastener is located very close to such features. Such a potential clash is not uncommon in aircraft structures, where it is possible for the outer edge of a fastener to be located only 1.6 mm from the edge of a fillet with a 5 mm radius. It also ensures that the seal is able to accommodate small surface feature deviations in the structural element, and is sufficiently thick to have a degree of flexibility once cured.

Referring to FIG. 3, each channel 350 has an inlet 360 arranged to receive the flow of curable sealing material from the sealing material inlet and an outlet 361 arranged to feed the flow of curable sealing material into the upper part of the annular sealing volume 334a. The channels 350 terminate at the shoulder 314 so that their outlets 361 are set back in an axial direction from the edge 318 of the base 311.

The series of channels 350 present low resistance to flow so the sealing material can flow more freely from the reservoir into the annular sealing volume.

As can be seen on the left-hand side of FIG. 2a, the depth of each channel 350 gradually reduces in the direction of flow. As can be seen in FIG. 3, the circumferential width of each channel 350 also increases as it extends towards the annular sealing volume in the direction of flow. This encourages the streams of sealing material from the channels to merge as they exit the channels 350 and enter the annular sealing volume 334a-c.

During installation, the cap 300 is first placed in the position shown in FIG. 2a, with the tail end (or alternatively the head end) of a fastener enclosed within the air cavity 312. The nozzle 309 of a sealing material injector gun is then fitted onto the boss 344 to create a temporary seal therebetween. Pre-mixed sealing material 301 is then injected from the nozzle 309 into the reservoir 332, where it collects. When the reservoir 332 is full it overflows, causing an evenly distributed flow of sealing material into the channels 350. Once the channels 350 are filled the pressure of the sealing material increases to a level at which it is forced into the annular sealing volume 334a-c. The sealing material completely fills the annular sealing volume 334a-c until it flows out and into contact with the structure 50, at which point the flow of sealing material from the nozzle 309 is stopped.

The injected sealant exerts pressure between the cap members which can exert a force between 30 N for smaller caps up to over 500 N for larger caps. Welding the cap members together before the sealant is injected prevents the outer cap member from becoming dislodged by this pressure.

After injection of curable sealing material into the sealing volume, the nozzle 309 is removed and the injected sealing material is left to cure. On curing, it provides a strong adhesive bond between the cap 300 and structure 50, and also between the inner and outer cap members 310, 320. When the sealing material is an epoxy based adhesive as discussed above, it may cure to handling strength (i.e. a degree suitable to provide sufficient strength to withstand knocks or similar from assembly workers) within an hour or so. This compares to handling strength cure times of 12 hours or more for polysulphide or manganese dioxide based sealants.

The cured injected sealing material also serves to fully seal the air cavity 312. Thus, trapped air within the air cavity 312 can provide a safe environment within which sparking and out-gassing events caused during a lightning strike can be contained. Ingress of fuel, water or other contaminants into the air cavity 312 is also prevented.

The sealing material injection method avoids the accumulation of air pockets (i.e. entrapment of air) within the sealing volume 334a-c, since a uniformly distributed coverage of sealing material is achieved. Such air pockets are particularly undesirable since they can cause the seal to be compromised and a consequent leakage of fuel through the fastener joint.

Figure 11:
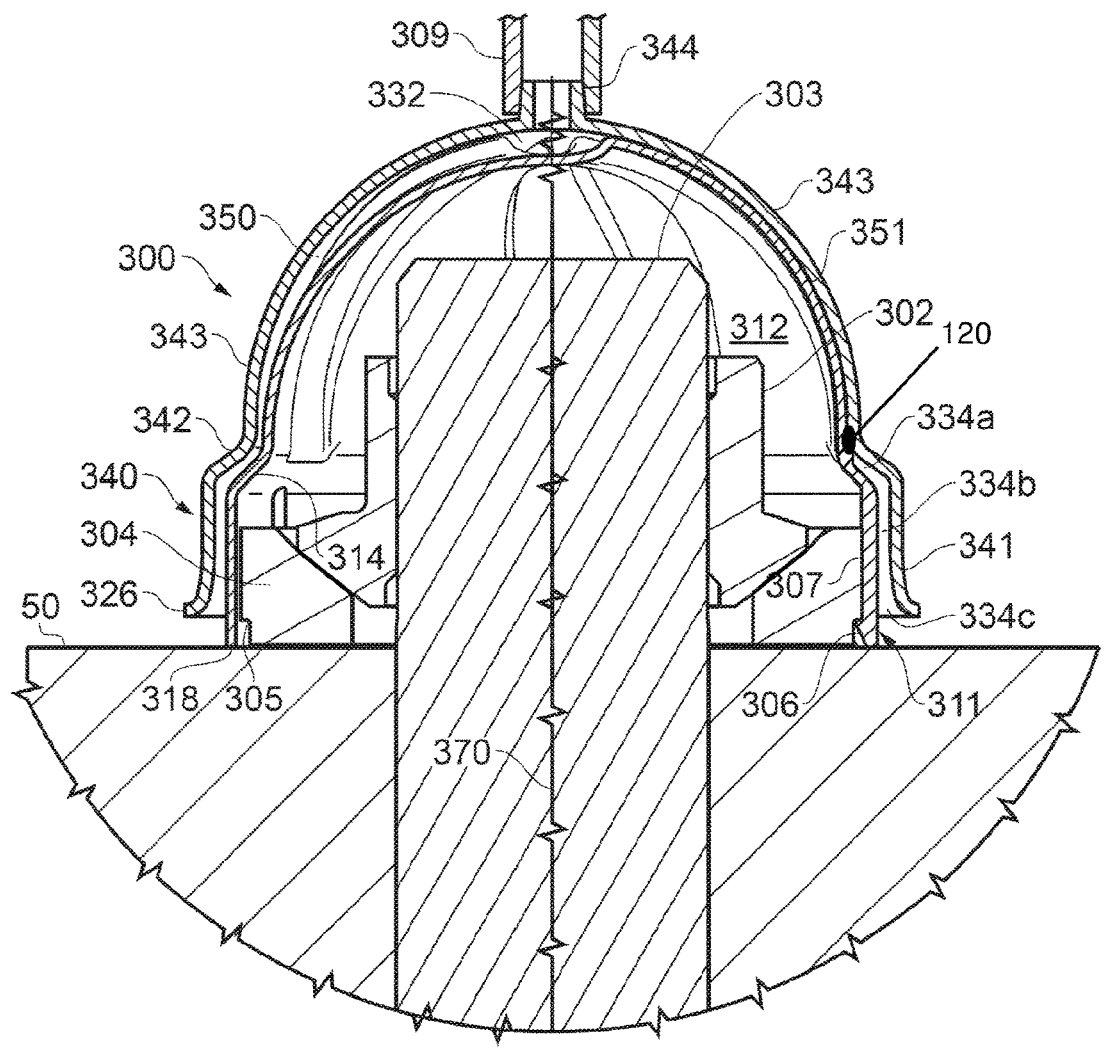
FIG. 11 is a section view of a nut cap according to a second embodiment of the invention before injection of sealing material.
Figure 12:
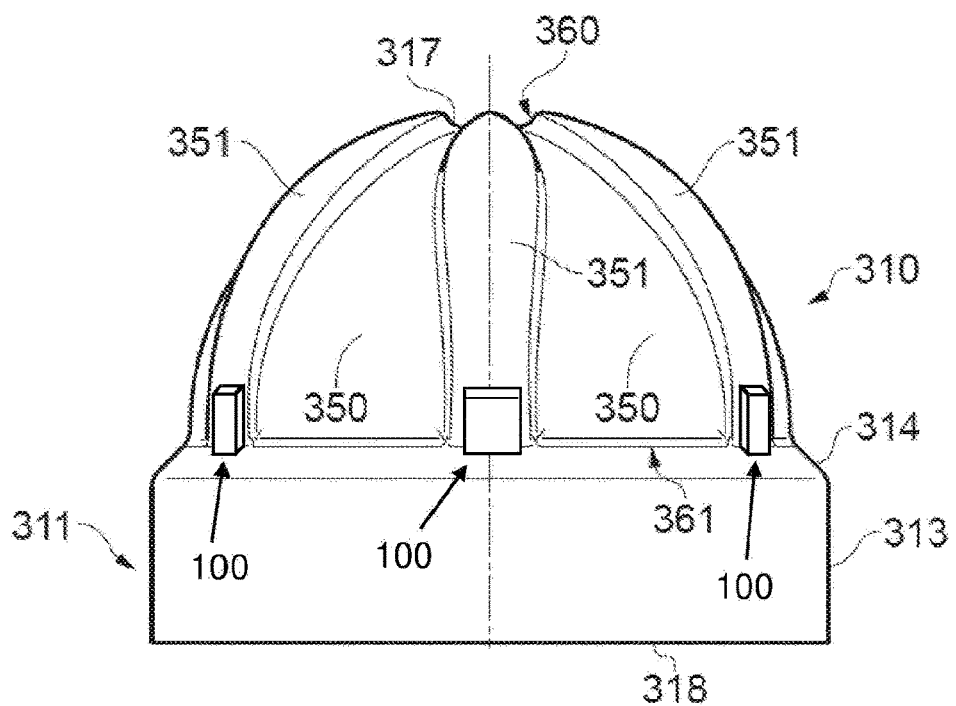
FIG. 12 is a side view of an inner cap member of the nut cap of FIG. 11.
Figure 13:
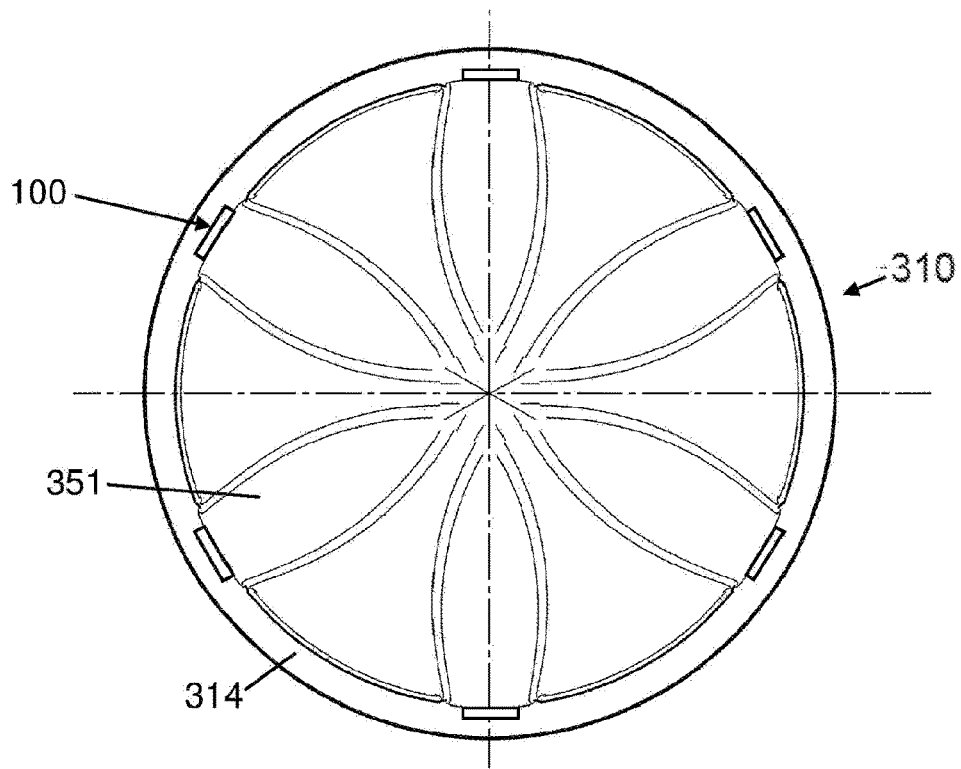
FIG. 13 is a plan view of the inner cap member of FIG. 12.
Figure 14:
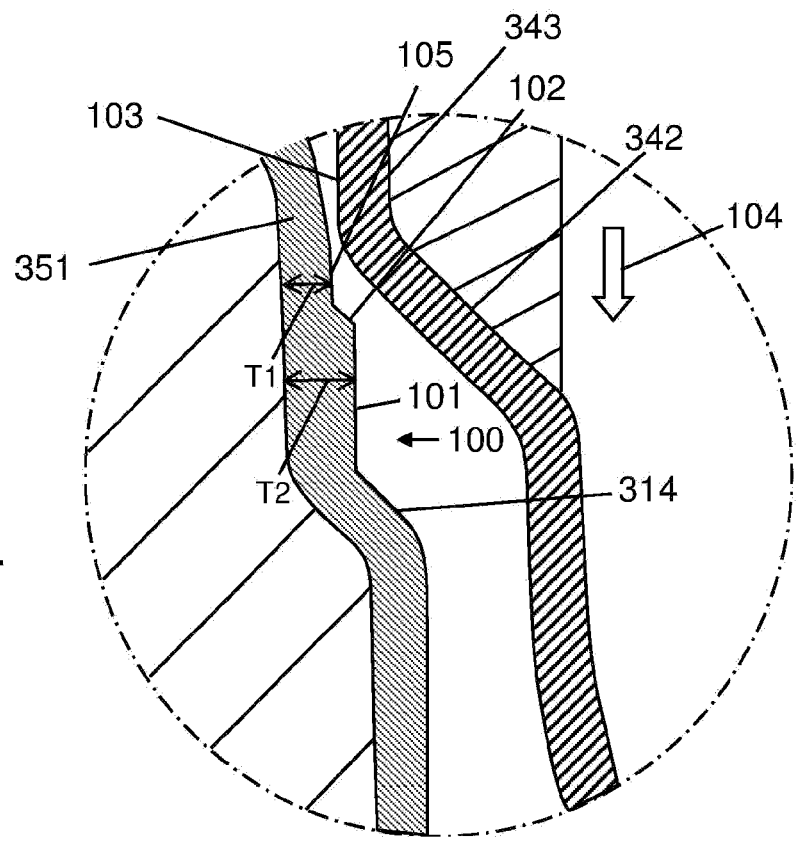
FIG. 14 is a section view of part of the nut cap of FIG. 11 in a partially assembled position.

FIG. 11 is a cross-sectional view of a nut cap according to a second embodiment of the invention. The nut cap is similar to the nut cap of the first embodiment and identical reference numbers are used to indicate identical features. In the second embodiment, a protruding weld feature 100 (shown in FIGS. 12-14) is formed on each ridge 351 in the inner cap member. The weld features 100 are formed at the base of the ridges 251 where the ridges 251 meet the shoulder 314. As shown in FIG. 14 each weld feature 100 has a radially directed side face 101 which meets the shoulder 314 at its lower (outboard) edge, and an angled upper face 102 which meets an outer surface 105 of the ridge 351 at a concave corner. The angled upper face 102 is tilted down from the horizontal at an angle of about 45°, although this angle may vary between 0° and 45°.

Figure 15:
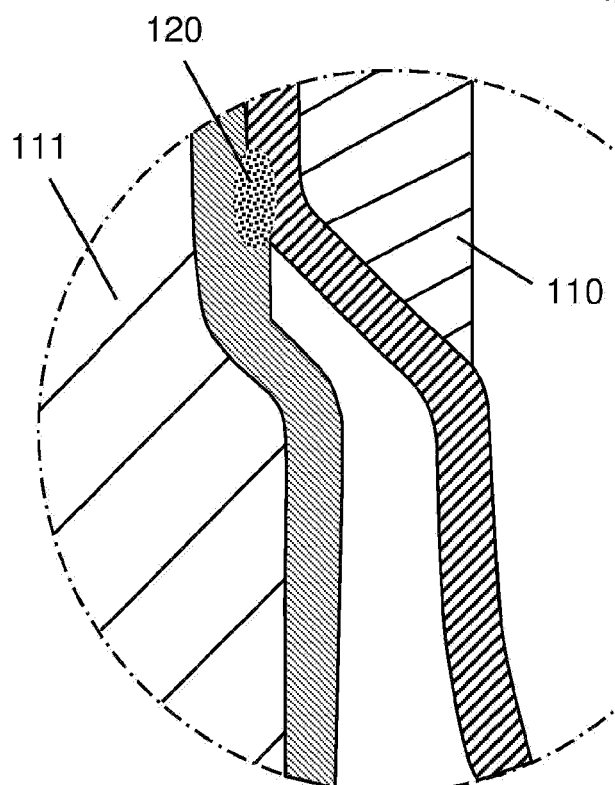
FIG. 15 is a section view of part of the nut cap of FIG. 11 in a fully assembled position including a weld joint.

A pair of ultrasonic tools 110, 111 shown in FIG. 15 are used to weld the cap members together. The upper tool 110 has an annular shape terminating at an angled rim which is shaped to intimately fit with the non-planar outer surface of the outer cap member (that is, the angled shoulder 342 and the vertical base of the domed portion 343 of the outer cap member). The lower tool 111 is received inside the inner cap member and is shaped to intimately engage with the non-planar inner surface of the outer cap member as shown in FIG. 15. The inner and outer cap members are brought together in an assembly direction 104, by moving the upper cap member down, moving the inner cap member up, or a combination of both. The following description assumes that the upper cap member is moved down. As the upper cap member and ultrasonic tool 110 move down in a direction 104 from the position of FIG. 14 to a partially assembled position in a first assembly phase, the outer cap member engages with the upper face 102 of the weld feature (due to an interference distance of about 0.3-0.5 mm between the surfaces 101 and 103). The upper cap is then pushed down further in a second assembly phase to the fully assembled position of FIG. 15 with ultrasonic energy (typically 20 kHz or 40 kHz) being applied during movement by the upper tool 110, the lower tool 111 or both. This ultrasonic energy causes the parallel telescoping surfaces 101, 103 to melt and coalesce in shear to form a weld 120 shown in FIG. 15.

The weld features 100 protrude from the ridges 351 so that they are the first part of the inner cap member to contact the outer cap member during assembly. That is, the weld features come into contact with the outer cap member before the cap members are fully assembled (unlike the rest of the ridge 351 which only contacts the outer cap member when the parts are fully assembled as in FIG. 15). The ridge 351 has a wall thickness which increases at the weld feature 100 from a thickness T1 to a thickness T2 as shown in FIG. 14. This increased wall thickness provides a stock of material which can coalesce with the outer cap member to form the weld.

Figure 16:
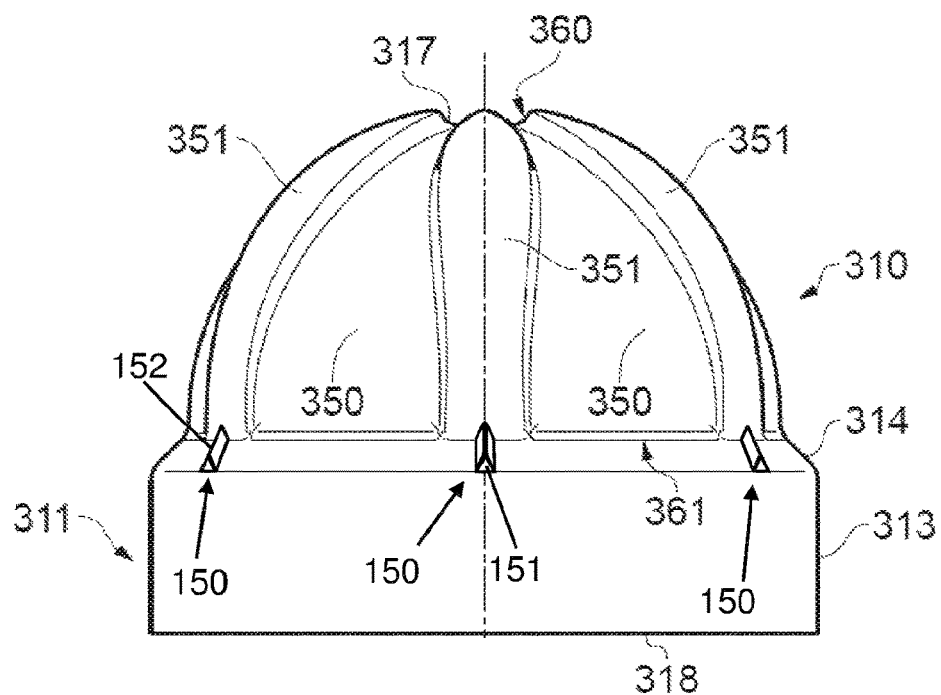
FIG. 16 is a side view of an inner cap member for a nut cap according to a third embodiment of the invention.
Figure 17:
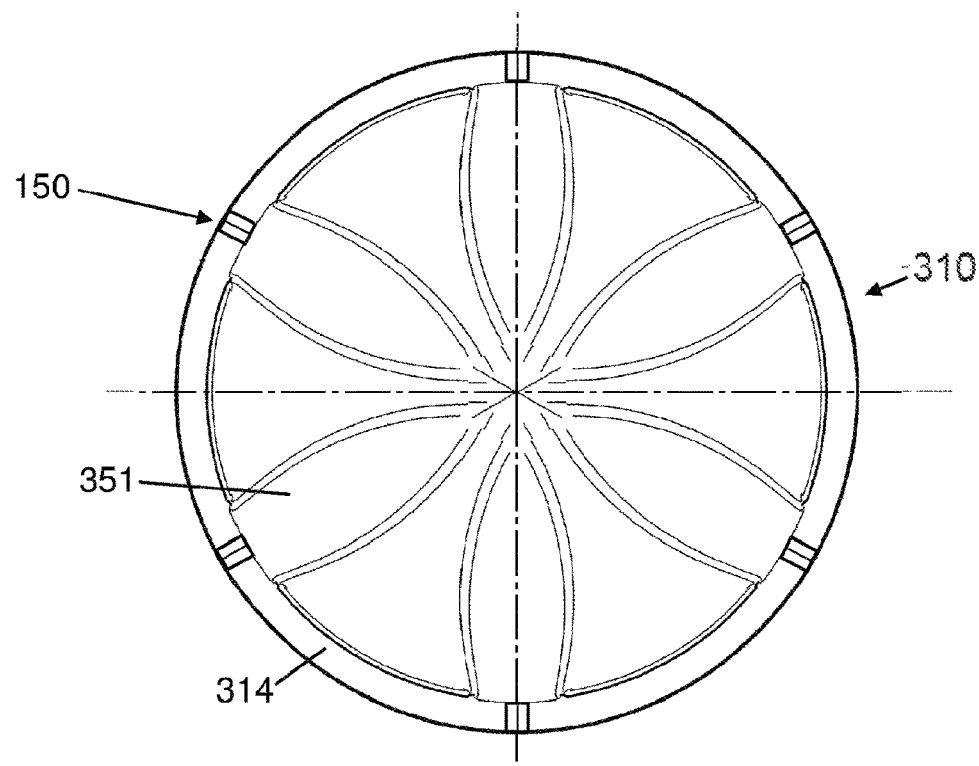
FIG. 17 is a plan view of the inner cap member of FIG. 16.

FIGS. 16 and 17 show an inner cap member for a nut cap according to a third embodiment of the invention. The nut cap is similar to the nut cap of the second embodiment and identical reference numbers are used to indicate identical features. In the third embodiment, a protruding weld feature 150 is formed on the shoulder 314 at the base of each ridge 351. Each weld feature 150 has a radially directed triangular side face 151 which lies flush with the base 313. The weld feature 150 has the shape of a triangular prism with a pair of sides which taper and meet at a sharp convex edge 152.

Figure 18:
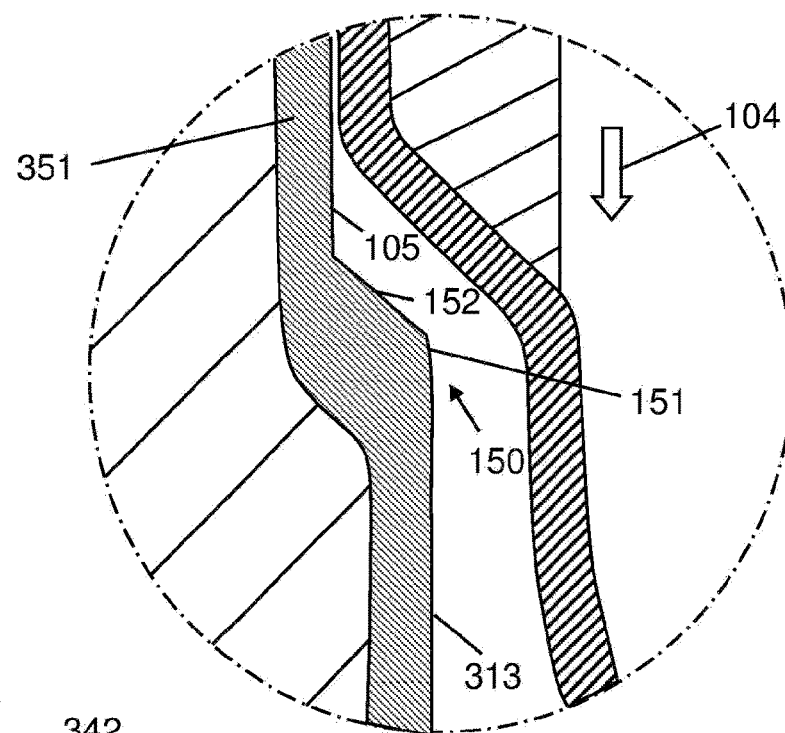
FIG. 18 is a section view of part of the nut cap according to the third embodiment of the invention in a partially assembled position.
Figure 19:
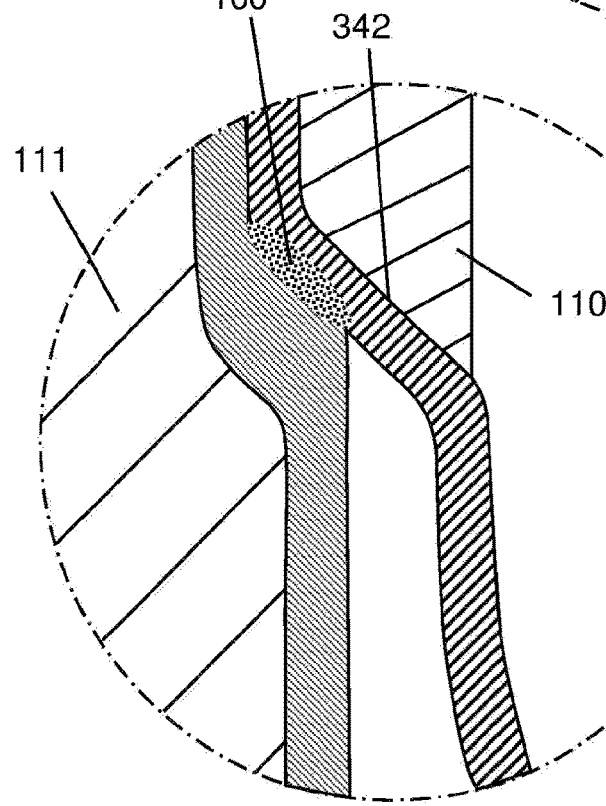
FIG. 19 is a section view of the nut cap of FIG. 18 in a fully assembled position including a weld joint.

The pair of ultrasonic tools 110, 111 shown in FIGS. 18 and 19 are used to weld the cap members together. As the upper cap member and ultrasonic tool 110 move down in a direction 104 from the position of FIG. 18, the outer cap member engages with the edge 152 of the weld feature 150 in a partially assembled position. This sharp edge 152 is the first part of the weld feature to come into contact with the outer cap member, and acts as an energy director which focuses the ultrasonic energy into the region of contact as the contacting surfaces melt and coalesce. As the cap moves down further to its fully assembled position, the weld feature 150 and the inner surface of the shoulder 342 melt and coalesce to form a weld 160 shown in FIG. 19.

Figure 20:
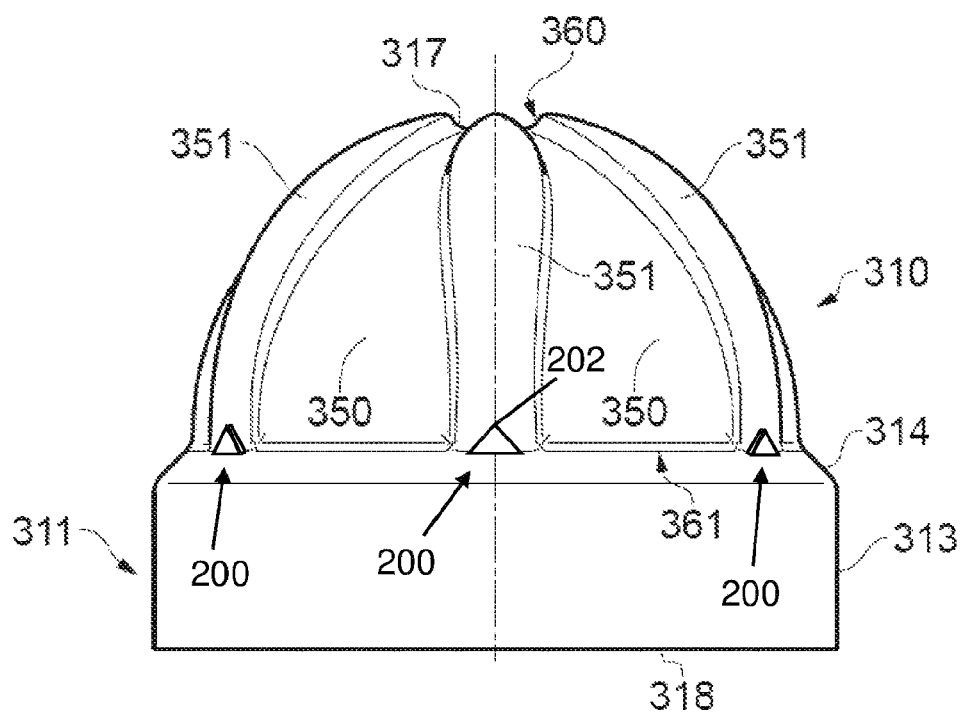
FIG. 20 is a side view of an inner cap member for a nut cap according to a fourth embodiment of the invention.

FIG. 20 shows an inner cap member for a nut cap according to a fourth embodiment of the invention. The nut cap is similar to the nut cap of the second and third embodiments and identical reference numbers are used to indicate identical features. In the fourth embodiment a triangular protruding weld feature 200 is formed in each ridge 351 of the inner cap member. Like the weld features 100 of the second embodiment, the weld features 200 are formed at the base of the ridges 251 where the ridges 251 meet the shoulder 314.

Like the weld features 150 of the third embodiment, each weld feature 200 has a radially directed side face 201. However rather than lying flush with the base 313, the side face 201 is set back from the convex corner where the shoulder meets the base 313 as shown in FIG. 21.

Like the weld features 150 of the third embodiment, the weld feature 200 has the shape of a triangular prism with a pair of sides which taper and meet at an edge 202.

Figure 21:
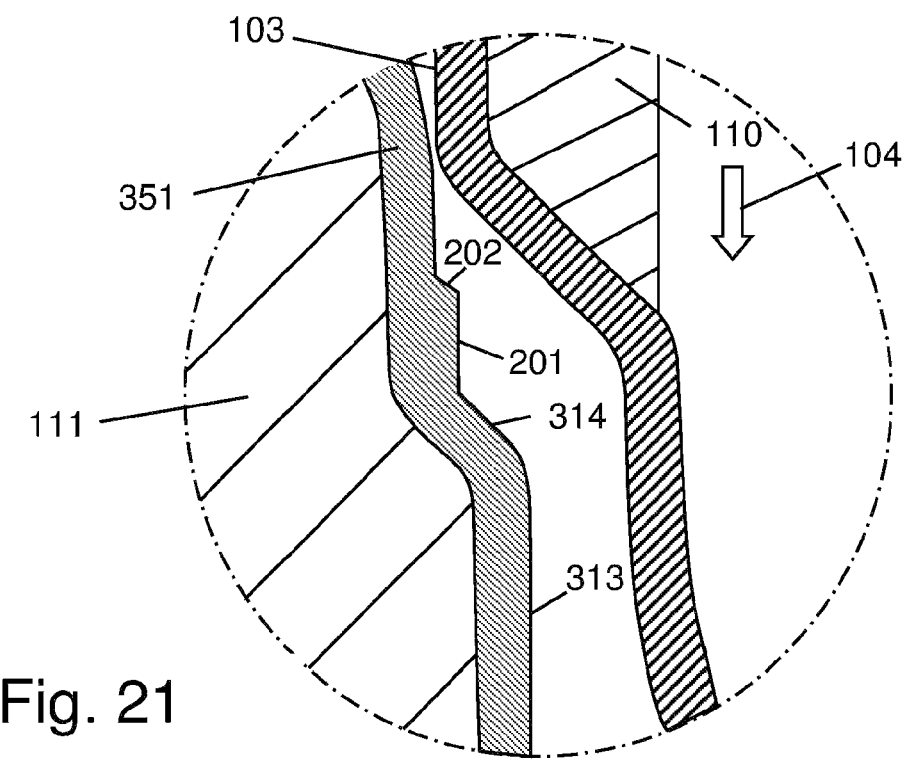
FIG. 21 is a section view of part of the nut cap according to the fourth embodiment of the invention in a partially assembled position.

As the upper cap member and ultrasonic tool 110 move down in a direction 104 from the position of FIG. 21, the outer cap member engages with the sharp edge 202 of the weld feature 200 (there is an interference distance of about 0.3-0.5 mm between the surfaces 201 and 103). As the cap moves down further the telescoping parallel surfaces 201, 103 melt and coalesce in shear to form a weld (not shown). The sharp edge 202 is the first part of the weld feature to come into contact with the outer cap member, and acts as an energy director which focuses the ultrasonic energy into the region of contact as the contacting surfaces melt and coalesce.

Figure 22:
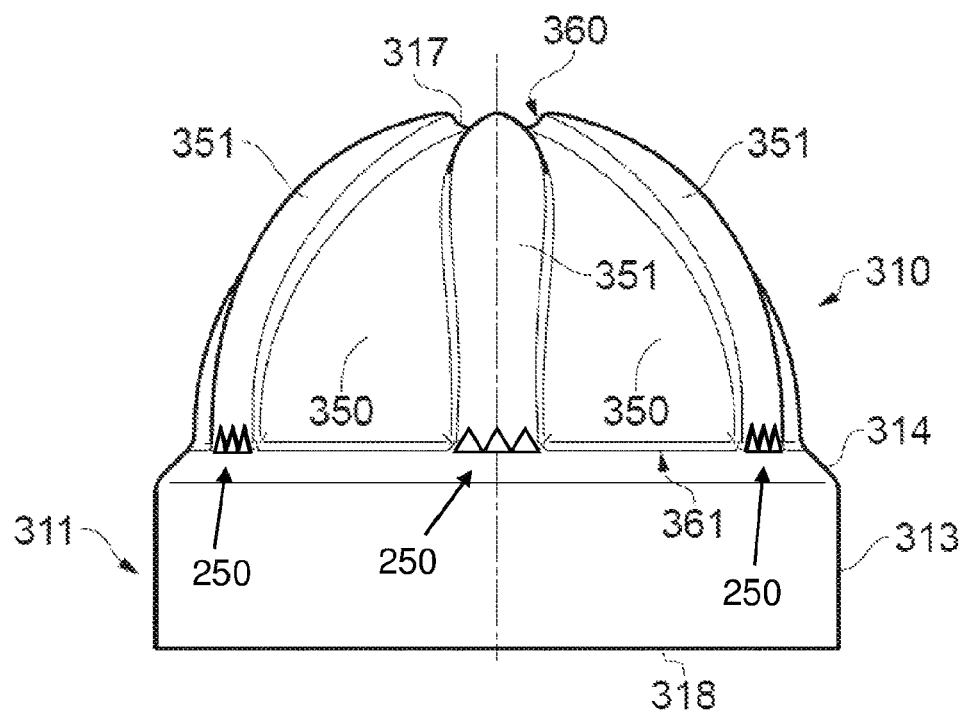
FIG. 22 is a side view of an inner cap member for a nut cap according to a fifth embodiment of the invention.
Figure 23:
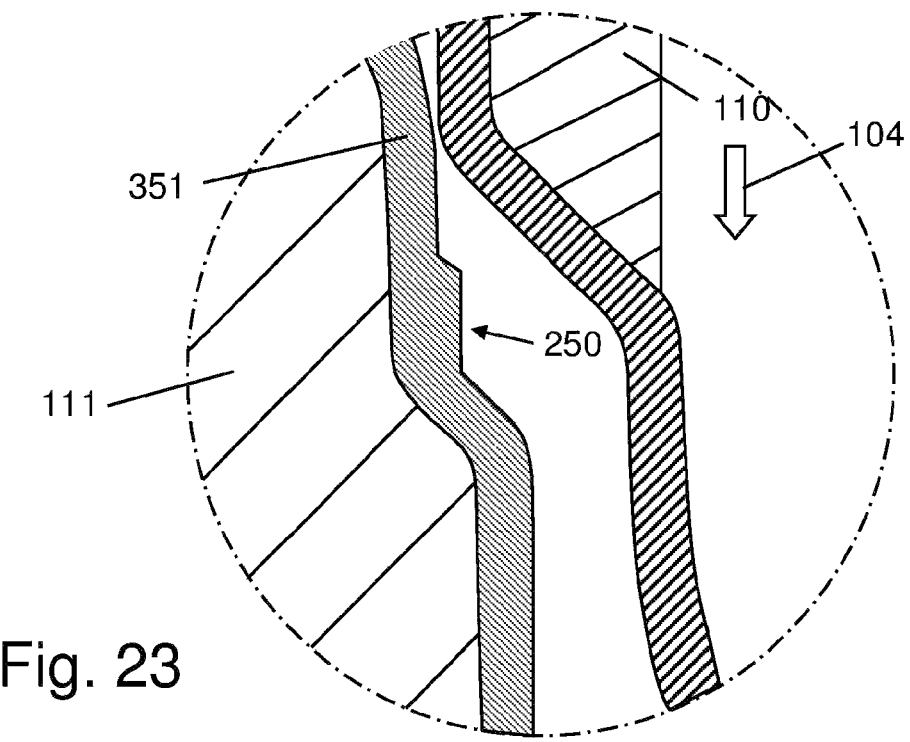
FIG. 23 is a section view of part of the nut cap according to the fifth embodiment of the invention in a partially assembled position.

FIGS. 22 and 23 show a fifth embodiment in which the single sharp-edged energy-directing weld feature 200 of the fourth embodiment is replaced by a set of three similar sharp-edged energy-directing weld features 250.

Figure 24:
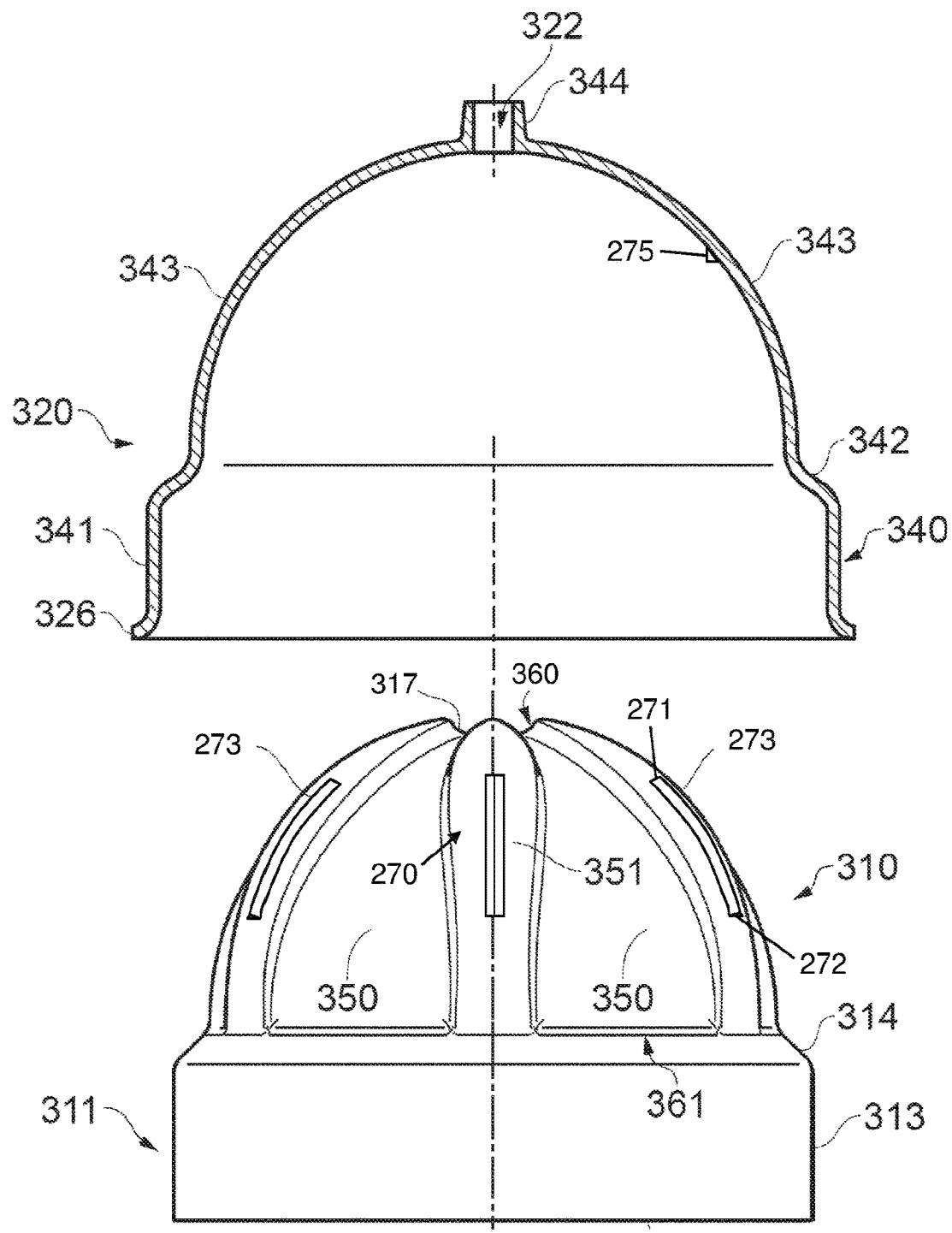
FIG. 24 shows a kit of parts for assembling a nut cap according to a sixth embodiment of the invention.

FIG. 24 shows a sixth embodiment in which the inner cap member is formed with a tapered protruding weld feature 270 on each ridge 351. Each weld feature 270 has a pair of triangular end faces 271, 272 and has the shape of a curved triangular prism with a pair of sides which taper and meet at a sharp edge 273 which curves to follow the domed shape of the ridge 351.

A pair of ultrasonic tools (not shown) are used to weld the cap members together. As the upper cap member and ultrasonic tool move down, the outer cap member engages with the edges 273 of the weld features. This sharp edge 273 is the first part of the weld feature to come into contact with the outer cap member, and acts as an energy director which focuses the ultrasonic energy into the region of contact as the contacting surfaces melt and coalesce. As the cap moves down further, the weld features 270 and the inner surface of the outer cap member melt and coalesce to form six welds (not shown). In an alternative embodiment one or more annular ridges may be formed in the inner surface of the domed part of the outer cap member, running round its full circumference. These annular ridges form point contacts with the six weld features 270, directing the ultrasonic energy into these points of contact. The sectional profile of one of such annular ridges 271 is shown by way of example.

FIGS. 25-29 show a kit of parts for forming an injectable nut cap according to an eighth embodiment of the present invention. The kit comprises an inner cap member 410 and an outer cap member 420. The inner cap member 410 is generally made up of a cylindrical base portion 413, and a domed portion 416 which extends from the base portion 413 to a planar apex 417.

The outer cap member 420 is also a generally thin-walled dome shaped member, and is shaped to fit over the inner cap member 410. The outer cap member 420 is generally made up of an annular flange 440, a cylindrical base 441, and a domed outboard portion 442. The domed outboard portion 442 contains an opening 422 sized to interconnect with the nozzle of a sealing material injector gun (not shown).

The inner cap member has side walls with a substantially uniform wall thickness. A plurality of outward-facing ridges 451 and channels 450 are formed in an outer surface of the inner cap member and the same number of corresponding inward-facing ridges 452 and channels 453 are formed in an inner surface of the inner cap member. The ridges 451 abut the inner surface of the outer cap member 420 when the cap is assembled so that the sealing material cannot flow between the channels. The ridges 451 are attached to the inner surface of the outer cap member 420 by ultrasonic welding.

Figure 25:
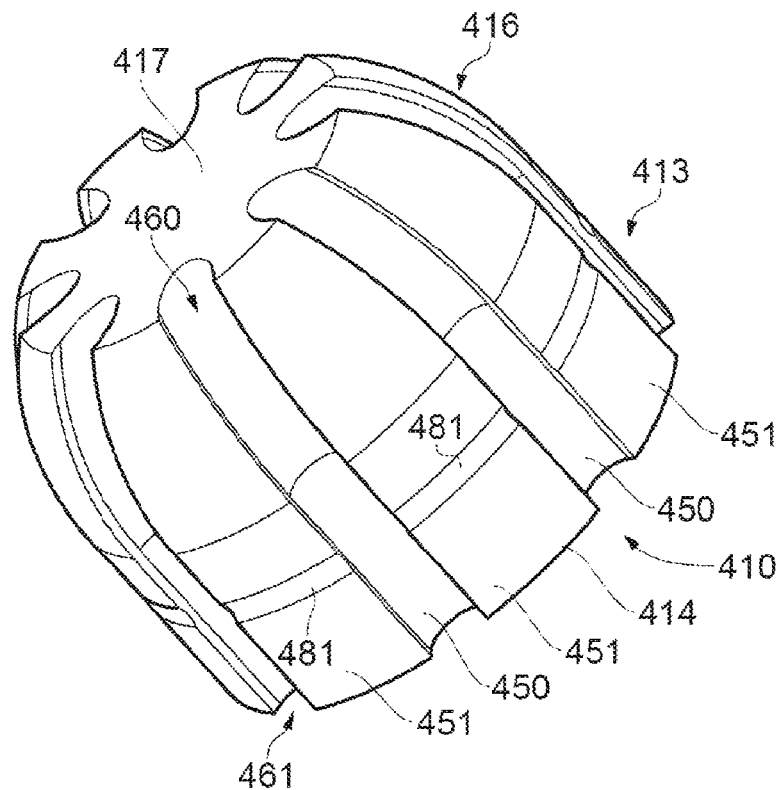
FIG. 25 is an isometric view of an inner cap member of a nut cap according to a seventh embodiment of the invention.
Figure 26:
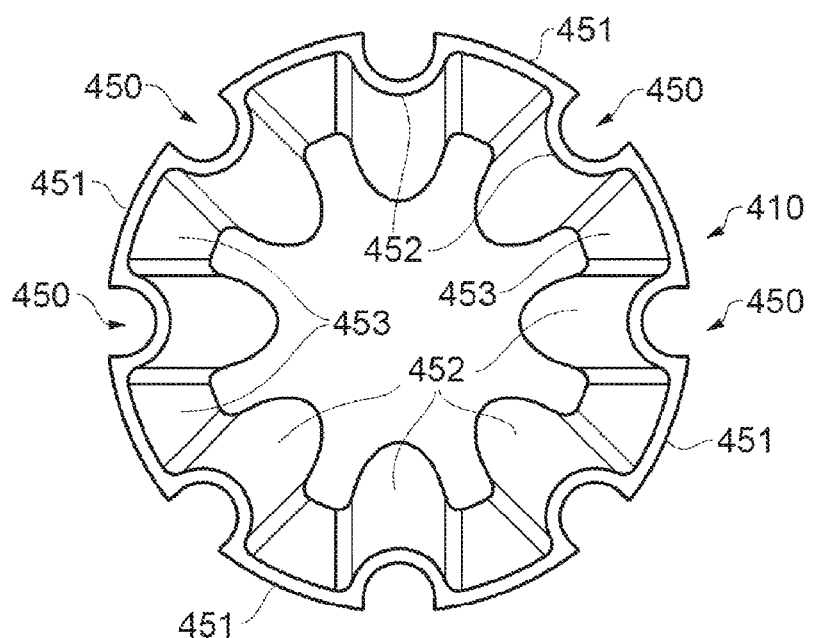
FIG. 26 is an under side view of the inner cap member of FIG. 25.
Figure 27:
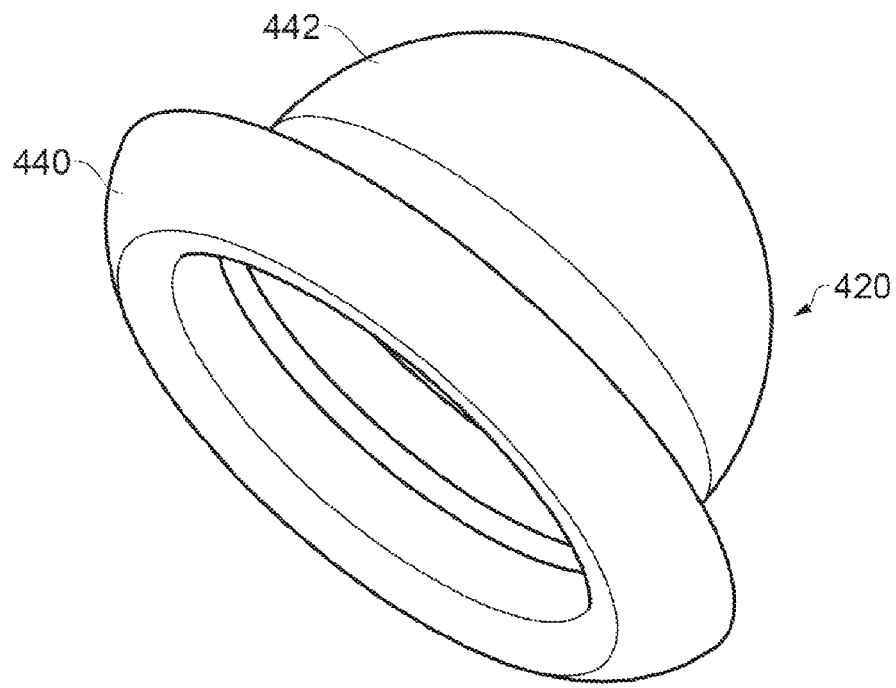
FIG. 27 is an isometric view of an outer cap member of the nut cap according to the seventh embodiment of the invention.
Figure 28:
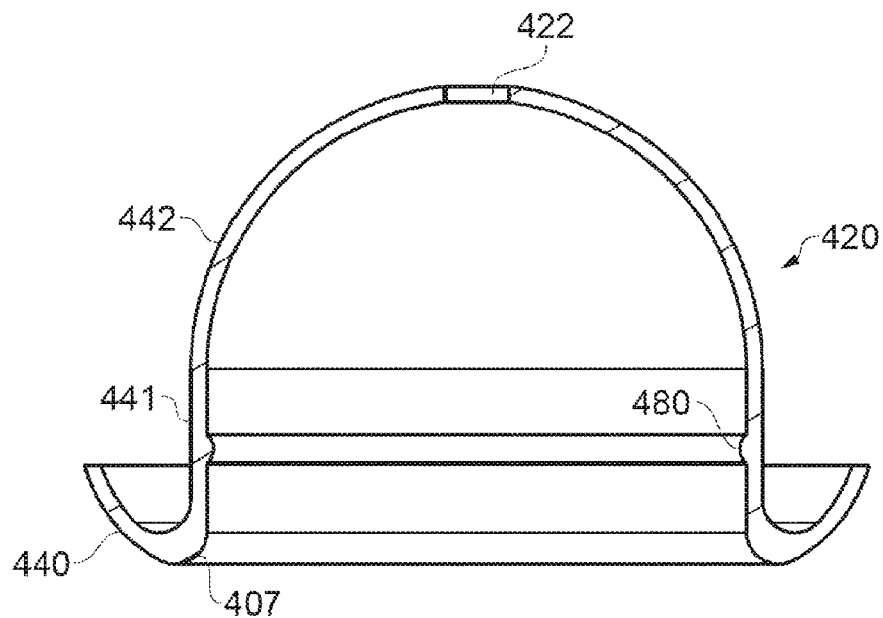
FIG. 28 is a section view of the outer cap member of FIG. 27.
Figure 29:
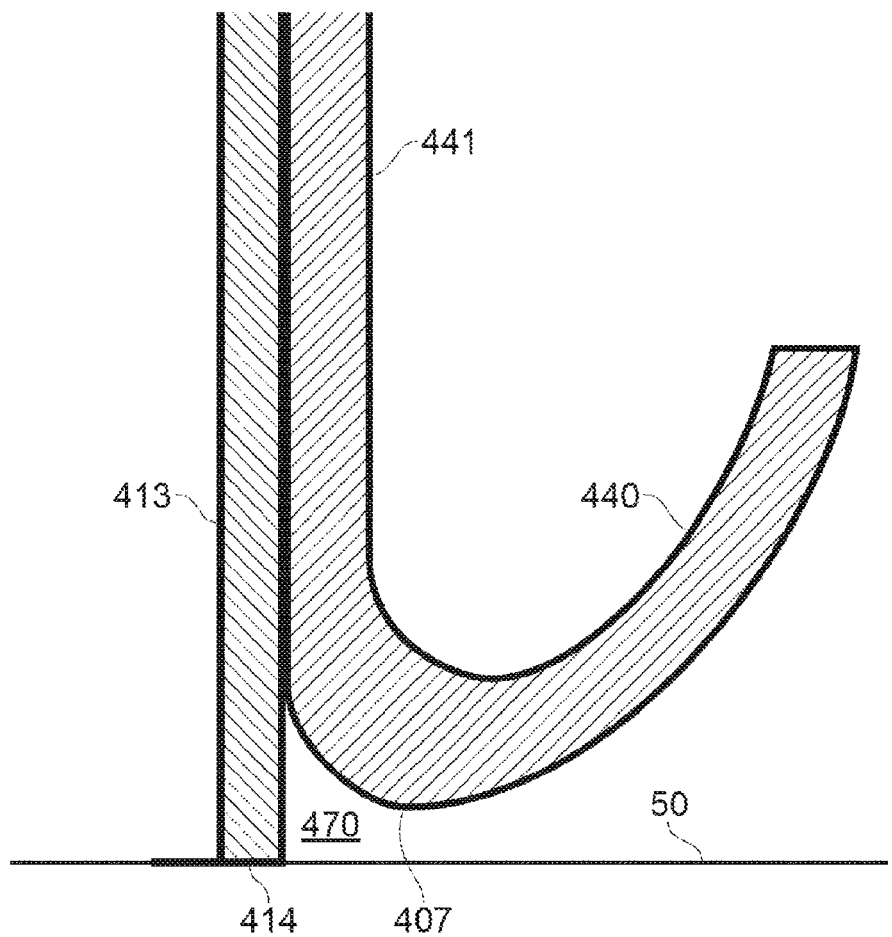
FIG. 29 is an enlarged section view of part of the nut cap according to the seventh embodiment of the invention in an installed state where it meets a structure.

When assembled as shown in FIG. 29, a small annular sealing volume (or pocket) 470 is formed between a curved radius 407 of the annular flange 440 and the base 413 of the inner cap member. Referring to FIG. 25, each channel 450 has an inlet 460 arranged to receive the flow of curable sealing material from the sealing material inlet and an outlet 461 arranged to feed the flow of curable sealing material into the annular sealing volume 470. Unlike the previous embodiments, the channels 450 terminate at the edge 414 of the base 413. The channels 450 have an approximately semi-circular sectional shape which presents a low resistance to flow. The depth and width of each channel 450 remains substantially constant along its length.

The inner surface of the base 441 of the outer cap member is formed with an annular projection 480 which is received as a snap fit in a corresponding recess 481 in the outer surface of the inner cap member.

In the embodiments of the invention discussed above the ridges and channels are formed in the inner cap member, and the outer cap member has a smooth outer surface. This is preferred since the smooth outer surface of the outer cap member does not attract dirt and has a profile with less impact on the flow of water or liquid over the cap. However in an alternative embodiment (not shown) the outer cap member instead of the inner cap member may be corrugated to form the ridges and channels.

In all of the embodiments described above the inner cap member and outer cap member are joined together by a plurality of welds (six welds in most embodiments, eight welds in the embodiment of FIGS. 25-29). The cap members are joined together by multiple separate welds rather than a single continuous weld running round the full circumference of the cap, with passages left between the welds to enable the curable sealing material to flow between them and into the annular sealing cavity. One of these passages is shown on the left-hand side of FIG. 11, opposite to the weld 120.

In most of the embodiments described above the protruding weld features are formed on the inner cap member rather than the outer cap member. However equivalent inwardly protruding weld features may be formed on the inner surface of the outer cap member. Such inwardly protruding weld features may be provided either instead of, or as well as, the outwardly protruding weld features on the inner cap member.

Although the invention has been described above with reference to one or more preferred embodiments, it will be appreciated that various changes or modifications may be made without departing from the scope of the invention as defined in the appended claims.

The invention claimed is:

1. A cap for forming a sealed cavity around one end of a fastener, the cap comprising:
   an inner cap member having an annular base terminating at an edge which surrounds an opening into an air cavity for enclosing the one end of a fastener;
   an outer cap member having an annular skirt or flange, the annular skirt or flange and annular base between them defining an annular sealing cavity; and
   a sealing material inlet comprising an opening in the outer cap member that is in fluid communication with the annular sealing cavity, the opening being arranged to interconnect with a sealing material injection device to provide a flow of curable sealing material from the sealing material inlet into the annular sealing cavity, wherein the inner cap member and outer cap member are welded together.

2. A cap according to claim 1 wherein the inner cap member and outer cap member are welded together by three or more welds with passages between the welds to enable the curable sealing material to flow between the welds and into the annular sealing cavity.

3. A cap according to claim 1 further comprising a plurality of channels formed in either an outer surface of the inner cap member or an inner surface of the outer cap member, each channel being in fluid communication with the opening of the sealing material inlet and the annular sealing cavity, wherein the inner cap member and outer cap member are welded together between the channels.

4. A cap according to claim 3 wherein either: the channels are formed in the outer surface of the inner cap member and are separated by ridges which abut the inner surface of the outer cap member, and at least one of the ridges which abuts the inner surface of the outer cap member is welded to the inner surface of the outer cap member; or the channels are formed in the inner surface of the outer cap member and separated by ridges which abut the outer surface of the inner cap member, and at least one of the ridges which abuts the outer surface of the inner cap member is welded to the outer surface of the inner cap member.

5. A cap according to claim 1, wherein the inner cap member comprises a substantially dome-shaped portion extending from the annular base, the outer cap member comprises a corresponding substantially dome-shaped portion extending from the annular skirt or flange, and the substantially dome shaped portions are welded together.

6. A cap according to claim 1, wherein the inner cap member comprises a shoulder joining the annular base to an outboard portion with a smaller outer diameter than the annular base, the shoulder meeting the annular base at a convex corner and meeting the outboard portion at a concave corner; and the outer cap member comprises a corresponding shoulder joining the annular skirt or flange to a corresponding outboard portion with a smaller inner diameter than the annular skirt or flange, the corresponding shoulder meeting the annular skirt or flange at a convex corner and meeting the corresponding outboard portion at a concave corner.

7. A cap according to claim 6 wherein the shoulder of the inner cap member is welded to the corresponding shoulder of the outer cap member.

8. A cap according to claim 6 wherein the outboard portion of the inner cap member is welded to the outboard portion of the outer cap member.

9. A cap according to claim 1 wherein the inner and outer cap members are each formed from thermoplastic material.

10. A joint comprising:
   a structure;
   a fastener passing through the structure;
   a cap according to claim 1, wherein the air cavity of the inner cap member encloses an end of the fastener and the edge of the inner cap member abuts the structure; and sealing material filling the annular sealing cavity of the cap and contacting the structure to seal the air cavity.

11. A kit of parts which can be assembled and welded to provide a cap according to claim 1, the kit of parts comprising:
an inner cap member having an annular base terminating at an edge which surrounds an opening into an air cavity for enclosing the end of a fastener; and
an outer cap member having an annular skirt or flange, wherein the cap members are shaped so that when assembled with the inner cap member fitted inside the outer cap member, the annular skirt or flange and annular base between them define an annular sealing cavity, and
wherein the inner or outer cap member comprises a wall which is formed with a weld feature which protrudes from the wall so that it comes into contact with the other cap member as the inner and outer cap members are being assembled.

12. The kit of parts of claim 11 wherein the inner or outer cap member comprises a wall which is formed with three or more weld features which protrude from the wall so that they come into contact with the other cap member when the inner and outer cap members are being assembled.

13. The kit of parts of claim 11 wherein the inner or outer cap member comprises a wall which is formed with a weld feature which protrudes from the wall so that it comes into contact with the other cap member when the inner and outer cap members are being assembled, and wherein the wall has a wall thickness which increases at the weld feature.

14. The kit of parts of claim 11 wherein the weld feature and the outer cap members have substantially parallel opposing surfaces.

15. The kit of parts of claim 11 wherein the weld feature tapers to a point or edge which is positioned so that it is the first part of the weld feature to come into contact with the other cap member when the inner and outer cap members are being assembled.

16. A method of manufacturing a cap according to claim 1, the method comprising assembling the inner cap member inside the outer cap member, and joining the inner cap member and outer cap member together by welding.

17. The method of claim 16 comprising joining the inner cap member and outer cap member together by ultrasonic welding.

18. The method of claim 16 further comprising generating a relative movement between the inner and outer cap members during said assembling, and welding them together during said relative movement.

19. The method of claim 16 wherein the inner and outer cap members have substantially parallel telescoping surfaces which coalesce in shear to weld the inner and outer cap members together.

20. A method of installing a cap to form a sealed cavity around one end of a fastener passing through a structure, the cap comprising a cap according to claim 1, the method including:
installing the cap over the one end of the fastener so that it is enclosed within the air cavity of the inner cap member and the edge of the annular base abuts the structure;
injecting curable sealing material into the annular sealing cavity via the sealing material inlet so that the curable sealing material contacts the structure; and
curing the curable sealing material to seal the air cavity.

* * * * *